(12) United States Patent
Bittar et al.

(10) Patent No.: US 9,529,113 B2
(45) Date of Patent: Dec. 27, 2016

(54) METHOD AND APPARATUS FOR DOWNHOLE MEASUREMENT TOOLS

(75) Inventors: Michael S. Bittar, Houston, TX (US); Shanjun Li, Katy, TX (US); Yumei Tang, Tomball, TX (US)

(73) Assignee: Halliburton Energy Services, Inc., Houston, TX (US)

(*) Notice: Subject to any disclaimer, the term of this patent is extended or adjusted under 35 U.S.C. 154(b) by 904 days.

(21) Appl. No.: 13/814,406

(22) PCT Filed: Aug. 31, 2010

(86) PCT No.: PCT/US2010/047333
§ 371 (c)(1),
(2), (4) Date: Feb. 5, 2013

(87) PCT Pub. No.: WO2012/030327
PCT Pub. Date: Mar. 8, 2012

(65) Prior Publication Data
US 2013/0144530 A1    Jun. 6, 2013

(51) Int. Cl.
*G01V 1/00* (2006.01)
*G01V 3/00* (2006.01)
(Continued)

(52) U.S. Cl.
CPC . *G01V 3/38* (2013.01); *G01V 3/12* (2013.01); *G01V 3/17* (2013.01); *G01V 3/28* (2013.01);
(Continued)

(58) Field of Classification Search
CPC ............ G01V 1/00; G01V 1/001; G01V 1/40; G01V 3/00; G01V 3/10; G01V 3/12; G01V 3/17; G01V 3/18; G01V 3/30; G01V 3/102; G01V 3/104
(Continued)

(56) References Cited

U.S. PATENT DOCUMENTS 5,435,069 A    7/1995  Nicholson
5,869,968 A    2/1999  Brooks et al.
(Continued)

FOREIGN PATENT DOCUMENTS

AU    2010359874 B2    8/2014
EP    2369890 A1       9/2011
(Continued)

OTHER PUBLICATIONS

International Application Serial No. PCT/US10/47333, Search Report mailed May 18, 2011, 5 Pgs.
(Continued)

*Primary Examiner* — John Breene
*Assistant Examiner* — Lynda Dinh
(74) *Attorney, Agent, or Firm* — Schwegman Lundberg & Woessner, P.A.; Benjamin Fite

(57) ABSTRACT

Various embodiments include apparatus and methods of operation with respect to well logging. Apparatus and methods include a tool having an arrangement of transmitters and receivers that are operated at different positions downhole and a processing unit to process collected signals such that the arrangement of transmitters and receivers provides measurements that mimic operation of a different arrangement of transmitters and receivers. Additional apparatus, systems, and methods are disclosed.

40 Claims, 18 Drawing Sheets

(51) Int. Cl.
*G01V 3/38* (2006.01)
*G01V 3/30* (2006.01)
*G01V 3/12* (2006.01)
*G01V 3/17* (2006.01)
*G01V 3/28* (2006.01)
*G01V 1/40* (2006.01)

(52) U.S. Cl.
CPC ................ *G01V 3/30* (2013.01); *G01V 1/001* (2013.01); *G01V 1/40* (2013.01)

(58) Field of Classification Search
USPC .............................................. 702/7, 6, 9–11
See application file for complete search history.

(56) References Cited

U.S. PATENT DOCUMENTS

| | | | |
|---|---|---|---|
| 5,942,990 | A | 8/1999 | Smith et al. |
| 6,163,155 | A | 12/2000 | Bittar |
| 6,304,086 | B1 | 10/2001 | Minerbo et al. |
| 6,476,609 | B1 | 11/2002 | Bittar |
| 6,556,016 | B2 | 4/2003 | Gao et al. |
| 6,584,408 | B2 | 6/2003 | Omeragic |
| 6,798,208 | B2 | 9/2004 | Omeragic |
| 6,819,111 | B2 | 11/2004 | Fanini et al. |
| 6,819,112 | B2 | 11/2004 | Gianzero et al. |
| 6,911,824 | B2 | 6/2005 | Bittar |
| 6,924,646 | B2 | 8/2005 | Omeragic |
| 6,934,635 | B2 | 8/2005 | Kennedy |
| 6,937,021 | B2 | 8/2005 | Rosthal |
| 6,969,994 | B2 | 11/2005 | Minerbo et al. |
| 7,019,528 | B2 | 3/2006 | Bittar |
| 7,091,877 | B2 | 8/2006 | Barber et al. |
| 7,138,803 | B2 | 11/2006 | Bittar |
| 7,202,670 | B2 | 4/2007 | Omeragic et al. |
| 7,265,552 | B2 | 9/2007 | Bittar |
| 7,414,406 | B2 | 8/2008 | Banning et al. |
| 7,425,830 | B2 | 9/2008 | Banning et al. |
| 7,474,387 | B2 | 1/2009 | Yabe |
| 7,536,261 | B2 | 5/2009 | Omeragic et al. |
| 7,538,555 | B2 | 5/2009 | Banning et al. |
| 7,557,581 | B2 | 7/2009 | Ostermeier et al. |
| 7,619,540 | B2 | 11/2009 | Bonner et al. |
| 7,659,722 | B2 | 2/2010 | Bittar |
| 7,747,387 | B2 | 6/2010 | Page |
| 2003/0023381 | A1 | 1/2003 | San Martin |
| 2003/0090269 | A1 | 5/2003 | Fanini et al. |
| 2004/0059515 | A1 | 3/2004 | Kennedy |
| 2004/0183538 | A1 | 9/2004 | Hanstein et al. |
| 2004/0196047 | A1 | 10/2004 | Fanini et al. |
| 2007/0256832 | A1 | 11/2007 | Hagiwara et al. |
| 2007/0265784 | A1 | 11/2007 | Bal et al. |
| 2008/0224707 | A1 | 9/2008 | Wisler et al. |
| 2008/0290873 | A1 | 11/2008 | Homan et al. |
| 2009/0030615 | A1 | 1/2009 | Clark |
| 2009/0160449 | A1 | 6/2009 | Martinez et al. |
| 2009/0230968 | A1 | 9/2009 | Bittar et al. |
| 2009/0237083 | A1 | 9/2009 | Ostermeier et al. |
| 2009/0302851 | A1 | 12/2009 | Bittar et al. |
| 2009/0309600 | A1 | 12/2009 | Seydoux et al. |
| 2010/0004866 | A1 | 1/2010 | Rabinovich et al. |
| 2010/0007348 | A1 | 1/2010 | Fang et al. |
| 2010/0082255 | A1 | 4/2010 | Davydycheva et al. |
| 2010/0094558 | A1 | 4/2010 | Samworth |
| 2010/0117655 | A1 | 5/2010 | Bittar et al. |

FOREIGN PATENT DOCUMENTS

| | | | |
|---|---|---|---|
| GB | 2464270 A | 4/2010 | |
| WO | WO-2007133661 A2 | 11/2007 | |
| WO | WO-2008076130 A1 | 6/2008 | |
| WO | WO 2009029067 A1 * | 3/2009 | ............ E21B 47/12 |
| WO | WO-2012030327 A1 | 3/2012 | |

OTHER PUBLICATIONS

International Application Serial No. PCT/US10/47333, Written Opinion mailed May 18, 2011, 10 Pgs.
International Application Serial No. PCT/US2010/047333, Written Opinion mailed Oct. 31, 2012, 5 pgs.
International Application Serial No. PCT/US2010/047333, International Preliminary Report on Patentability mailed Jan. 30, 2013, 7 pgs.
Australian Application Serial No. 2010359874, First Examiner Report mailed Jul. 5, 2013, 3 Pgs.
Australian Application Serial No. 2010359874, Response filed Mar. 4, 2014 to First Examiner Report mailed Jul. 5, 2013, 22 pgs.
European Application Serial No. 10752491.0, Office Action mailed Apr. 16, 2013, 2 pgs.
European Application Serial No. 10752491.0, Response filed Sep. 24, 2013 to Office Action mailed Apr. 16, 2013, 10 pgs.
Gulf Cooperation Council Application Serial No. 201119195, Office Action mailed Dec. 29, 2014, 4 pgs.
Australian Application Serial No. 2010359874, Second Examination Report mailed Apr. 4, 2014, 3 pgs.
International Application Serial No. PCT/US2010/047333, Response filed Dec. 31, 2012 to Written Opinion mailed Oct. 31, 2012, 3 pgs.
Australian Application Serial No. 2010359874, Response filed Jun. 30, 2014 to Second Examination Report mailed Apr. 4, 2014, 16 pgs.
Singaporean Application Serial No. 201301224-0, Examination Report mailed Mar. 13, 2014, 7 pgs.
European Application Serial No. 10752491.0, Office Action iled Dec. 17, 2015, 5 pgs.
Malaysian Application Serial No. PI2013000550, Substantive Examination Clear Report and Search Report mailed Dec. 15, 2015, 3 pgs.
European Application Serial No. 10752491.0, Response filed Apr. 25, 2016 to Office Action mailed Dec. 17, 2015, 11 pgs.

* cited by examiner

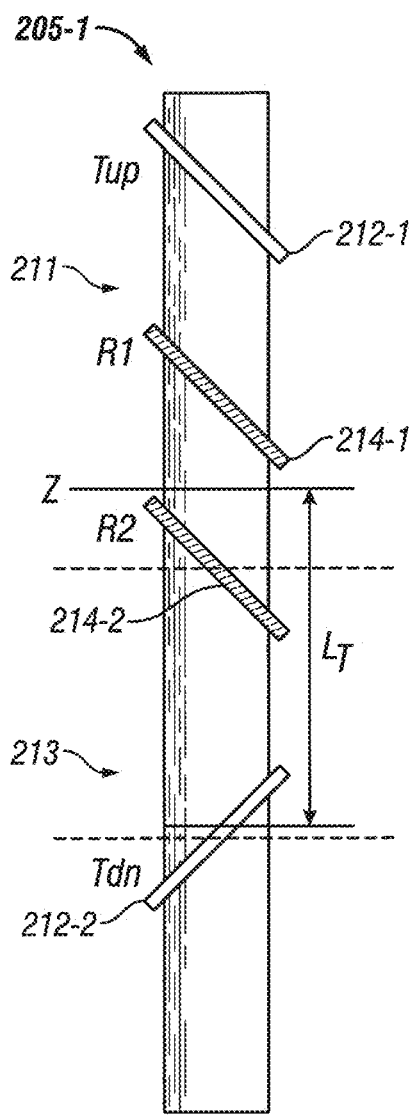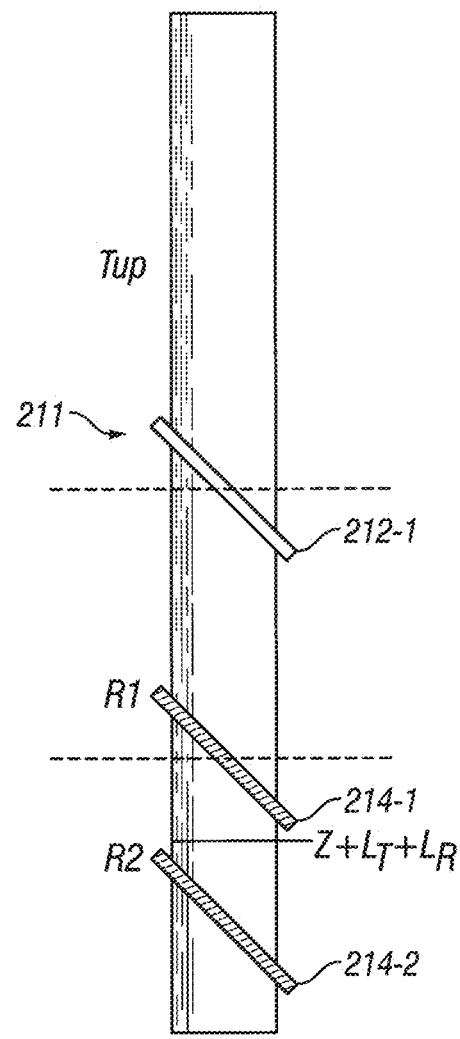
*FIG. 11A*    *FIG. 11B*

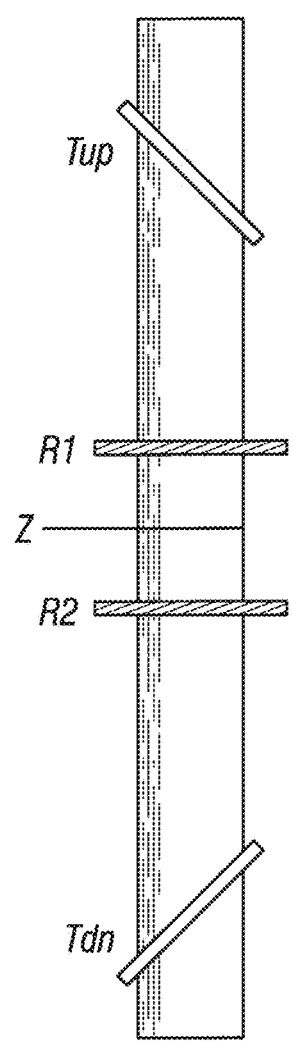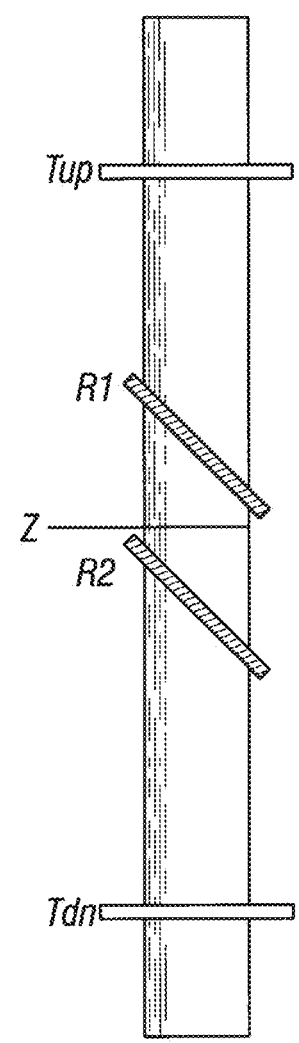
FIG. 15A                    FIG. 15B

METHOD AND APPARATUS FOR DOWNHOLE MEASUREMENT TOOLS

RELATED APPLICATIONS

This application is an U.S. National Stage Filing under 35 U.S.C. 371 from International Application No. PCT/US2010/047333, filed on 31 Aug. 2010, and published as WO 2012/030327 A1 on 8 Mar. 2012, which application and publication are incorporated herein by reference in their entirety.

TECHNICAL FIELD

The present invention relates generally to systems having well logging capability.

BACKGROUND

In drilling wells for oil and gas exploration, understanding the structure and properties of the geological formation surrounding a borehole provides information to aid such exploration. However, the environment in which the drilling tools operate is at significant distances below the surface and measurements to manage operation of such equipment are made at these locations. Logging is the process of making measurements via sensors located downhole, which can provide valuable information regarding the formation characteristics. For example, induction logging utilizes electromagnetic signals that can be used to make deep measurements, and which are substantially unaffected by the borehole and the effects of the zone invaded by the drilling. Further, the usefulness of such measurements may be related to the precision or quality of the information derived from such measurements.

BRIEF DESCRIPTION OF THE DRAWINGS

FIGS. 11A and 11B illustrate down shifting the up-transmitter system of FIG. 3A, in accordance with various embodiments.

FIGS. 15A-15D shows examples of different physical structures that can be realized in measurement functions by a tool, having a fixed arrangement of transmitters and receivers, operated with respect to shifting positions of the transmitters relative to the receivers, according to various embodiments.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 1:
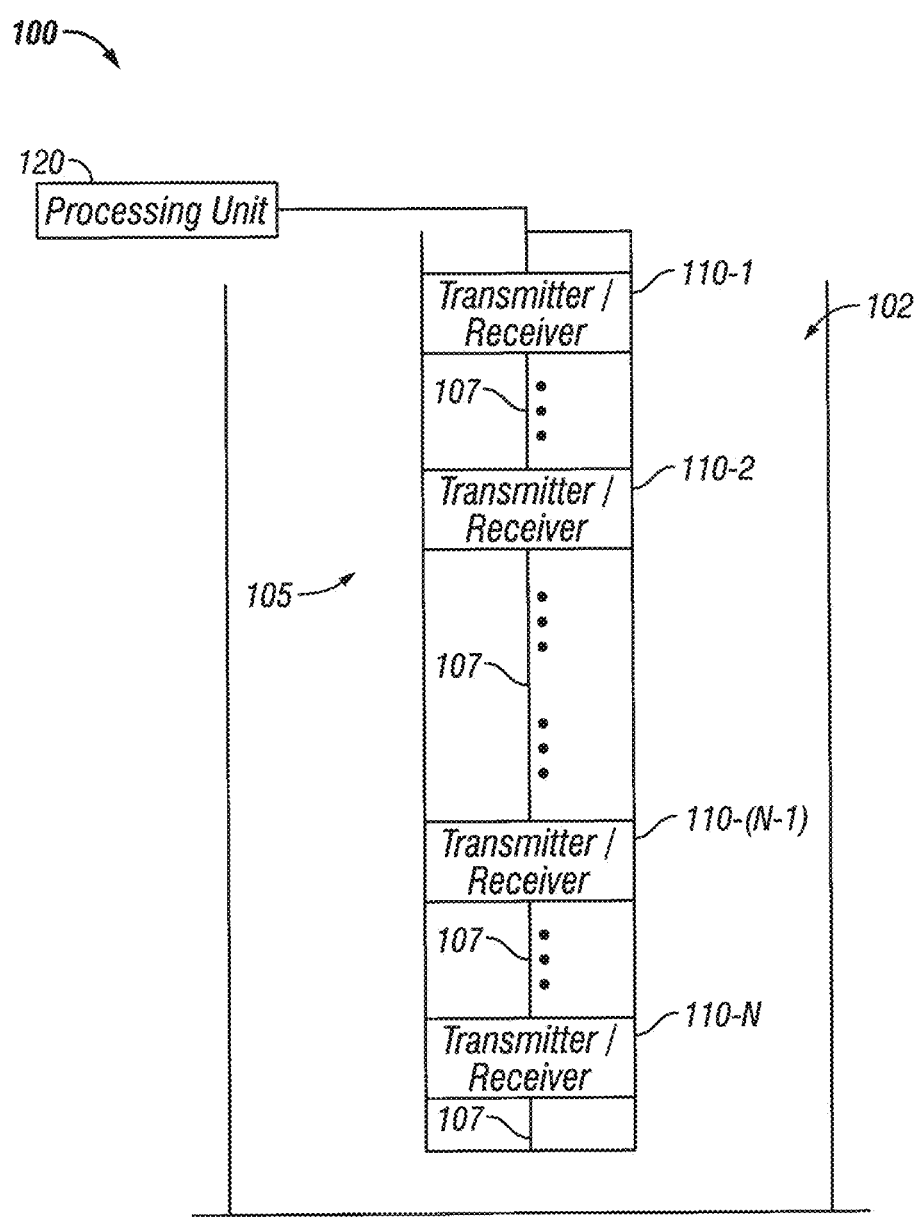
FIG. 1 shows a block diagram of an embodiment an apparatus having a processing unit and a tool to determine properties downhole in a well, according to various embodiments.

FIG. 1 shows a block diagram of an embodiment of an apparatus 100 having a processing unit 120 and a tool 105 to determine properties downhole in a well 102. Tool 105 has an arrangement of transmitters and receivers 110-1, 110-2 ... 110-(N-1), 110-N to operate in conjunction with processing unit 120 to mimic a different arrangement of transmitters and receivers. Mimic as used herein means to imitate or copy in operation. Equivalent, similar, or identical control and processing of arrangements of transmitters and receivers as disclosed in various embodiments herein provide a mechanism for these arrangements to simulate or resemble closely in operation other physical arrangements of transmitters and receivers such as to be an imitation or imitations of these other physical arrangements.

In an embodiment, an arrangement of transmitters and receivers 110-1, 110-2 . . . 110-(N-1), 110-N can operate in conjunction with processing unit 120 to mimic a desired triaxial tool, where it may not be possible to physically implement such a triaxial tool for operation in well 102. Transmitters and receivers 110-1, 110-2 . . . 110-(N-1), 110-N can be oriented with respect to longitudinal axis 107 of tool 105. Each of transmitters and receivers 110-1, 110-2 . . . 110-(N-1), 110-N can be tilted with respect to longitudinal axis 107. For example, each of transmitters and receivers 110-1, 110-2 . . . 110-(N-1), 110-N can be tilted at 45° with respect to longitudinal axis 107 with two transmitters perpendicular to each other. The two perpendicular transmitters can be disposed on tool 105 with two receivers located between the two transmitters. Each sensor element (i.e., transmitters and receivers) in arrangement of transmitters and receivers 110-1, 110-2 . . . 110-(N-1), 110-N can be realized as a coil element, a tilted coil element, a wire element, a toroidal element, a solenoid element, an electrode type element, a transducer, or other appropriate electromagnetic based sensor. The selected sensors may operate in various frequency ranges.

Processing unit 120 provides signals to selectively activate transmitters and selectively acquire measurement signals at the arrangement of transmitters and receivers 110-1, 110-2 . . . 110-(N-1), 110-N. Processing unit 120 can control activation of the transmitters of tool 105 and can acquire and process signals received from the receivers and transmitters in tool 105 with respect to a reference location about which shifting of tool 105 is correlated to the transmission and reception of signals. A selective set of measurements taken with the shifting of tool 105 can essentially mimic an ideal physical triaxial tool for measuring formation properties downhole in well. The measurements can be taken with tool 105 shifted into specific positions with respect to the arrangement of transmitters and receivers 110-1, 110-2 . . . 110-(N-1), 110-N. The measurements can be taken with tool 105 by first determining a reference location and determining a set of locations relative to the reference location at which transmitters are to be activated and a set of locations relative to the reference location at which signals are to be acquired at receivers and transmitters with respect to the selective activation of the transmitter. With these locations stored in a machine readable storage medium accessible to processing unit 120, the firing of the relevant transmitters at their respective predetermined locations and the corresponding collection of signals at relevant receivers and transmitters at their respective predetermined locations can be made as the tool reaches these locations downhole, such as with a tool moving with a downhole drilling operation.

Processing unit 120 can be located at the surface of well 102 operably in communication with tool 105 via a communication mechanism. Such a communication mechanism can be realized as a communication vehicle that is standard for well operations. Processing unit 120 can be distributed along the mechanism by which tool 105 is placed downhole in well 102. Processing unit 120 can be integrated with tool 105 such that processing unit 120 is operable downhole in well 102. Processing unit 120 can be distributed along tool 105 or along a structure that delivers tool 105 downhole.

In various embodiments, a processing methodology operatively transforms an array arrangement of transmitters and receivers into a triaxial tool; that is, measurements made by the (non-triaxial) tool are processed to be equivalent to measurement by a tool having a desired triaxial physical structure. Such a triaxial tool can be used as a measurements-while-drilling (MWD) tool such as a logging-while-drilling (LWD) tool. In addition, the triaxial tool can be adapted as a wireline tool. The transformation can be realized by measurements taken with respect to a series of depth shifting operations. Once this transformation is performed, a compensated resistivity can be obtained. In addition, the dip angle, the azimuth, vertical resistivity $R_v$, and the horizontal resistivity $R_v$ of the formation can be computed.

Figure 2A:
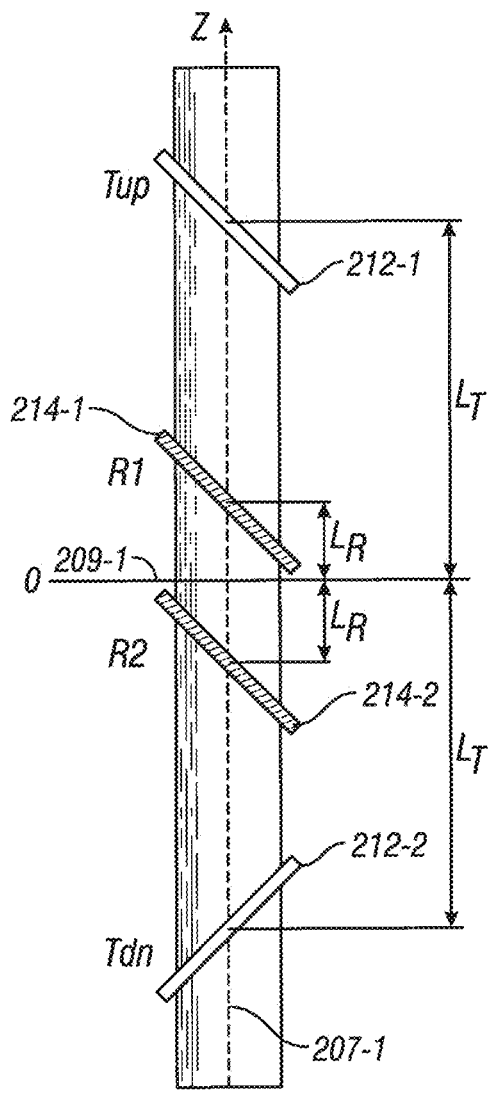
FIGS. 2A and 2B show example embodiments of arrangements of transmitters and receivers that can be used in conjunction with a processing unit to operate so as to mimic a different arrangement of transmitters and receivers, according to various embodiments.
Figure 2B:
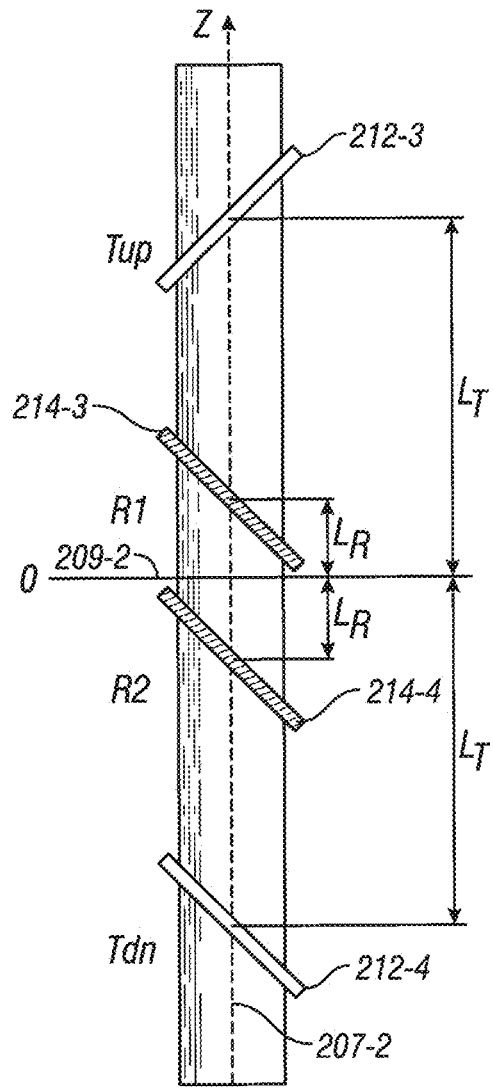

FIGS. 2A and 2B show example embodiments of arrangements of transmitters and receivers that can be used in conjunction with a processing unit to operate so as to mimic a different arrangement of transmitters and receivers. An arrangement of transmitters and receivers can be used in conjunction with a processing unit to operate such as to mimic a desired triaxial tool, where such triaxial tool may not be physically realizable. Such arrangements may be used in apparatus 100 of FIG. 1.

FIG. 2A shows an embodiment of a tool 205-1 that includes receiver antennas 214-1 and 214-2 and transmitter antennas 212-1 and 212-2, where transmitter antennas 212-1 and 212-2 are arranged symmetrically with respect to a middle location 209-1 between receiver antennas 214-1 and 214-2 with receiver antennas 214-1 and 214-2 between transmitter antennas 212-1 and 212-2 such that receiver antennas 214-1 and 214-2 are central with respect to the sensors of tool 205-1. Transmitter antenna 212-1 may be referred to as $T_{UP}$ and transmitter antenna 212-2 may be referred to as $T_{DN}$, indicating that $T_{UP}$ is above $T_{DN}$ when the tool is disposed downhole. Transmitter antennas 212-1 and 212-2 and receiver antennas 214-1 and 214-2 are tilted with respect to a longitudinal axis 207-1 of tool 205-1. With tool 205-1 having a cylindrical-like shape, longitudinal axis 207-1 is along the length of tool 205-1.

In the example shown in FIG. 2A, receiver antennas 214-1 and 214-2 are separated from each other by $2L_R$ with each of receiver antennas 214-1 and 214-2 having centers on the longitudinal axis 207-1 separated from central point 209-1 between receiver antennas 214-1 and 214-2 by the distance $L_R$. Central point 209-1 may be taken as a reference point. Central point 209-1 may be assigned a numerical value of zero as the point of reference for the effective shifting operations to enable the mimicking of a different arrangement of transmitter antennas and receiver antennas, such as mimicking a triaxial tool. Each of transmitter antennas 212-1 and 212-2 have a center on the longitudinal axis 207-1 separated from central point 209-1 by the distance $L_T$. The centers of transmitter antennas 212-1 and 212-2 are separated from each other by $2L_T$. In the example shown in FIG. 2A, all antennas are at the same tilt angle with respect to longitudinal axis 207-1, where the tilt angle may equal 45° with respect to longitudinal axis 207-1, with $T_{UP}$ and $T_{DN}$ oriented in directions perpendicular to each other.

FIG. 2B shows an embodiment of a tool 205-2 that includes receiver antennas 214-3 and 214-4 and transmitter antennas 212-3 and 212-4, where transmitter antennas 212-3 and 212-4 are arranged symmetrically with respect to a middle location 209-2 between receiver antennas 214-3 and 214-4 with receiver antennas 214-3 and 214-4 between transmitter antennas 212-3 and 212-4 such that receiver antennas 214-3 and 214-4 are central with respect to the sensors of tool 205-2. Transmitter antenna 212-3 may be referred to as $T_{UP}$ and transmitter antenna 212-4 may be referred to as $T_{DN}$, indicating that $T_{UP}$ is above $T_{DN}$ when the tool is disposed downhole. Transmitter antennas 212-3 and 212-4 and receiver antennas 214-3 and 214-4 are tilted with respect to a longitudinal axis 207-2 of tool 205-2. With tool 205-2 having a cylinder-like shape, longitudinal axis 207-2 is along the length of tool 205-2.

In the example shown in FIG. 2B, receiver antennas 214-3 and 214-4 are separated from each other by $2L_R$ with each of receiver antennas 214-3 and 214-4 having centers on the longitudinal axis 207-2 separated from central point 209-2 between receiver antennas 214-3 and 214-4 by the distance $L_R$. Central point 209-2 may be taken as a reference point. Central point 209-2 may be assigned a numerical value of zero as the point of reference for the effective shifting operations to enable the mimicking of a different arrangement of transmitter antennas and receiver antennas, such as mimicking a triaxial tool. Each of transmitter antennas 212-3 and 212-4 have a center on the longitudinal axis 207-2 separated from central point 209-1 by the distance $L_T$. The centers of transmitter antennas 212-3 and 212-4 are separated from each other by $2L_T$. In the example shown in FIG. 2B, all antennas are at the same tilt angle with respect to longitudinal axis 207-2, where the tilt angle may equal 45° with respect to longitudinal axis 207-2, with $T_{UP}$ and $T_{DN}$ oriented in directions perpendicular to each other.

Transmitter antennas and receiver antennas can be arranged into two kinds of relative positions: parallel and perpendicular. With φ being the tool rotating angle and with the receiver antenna and transmitter antenna parallel to each other, the received voltage at the receiver antenna, represented with the upper index pr, is expressed as:

$$V^{pr} = \frac{1}{2}V_{xx}\cos^2\phi + \frac{1}{2}V_{xy}\cos\phi\sin\phi + \frac{1}{2}V_{xz}\cos\phi + \frac{1}{2}V_{yx}\cos\phi\sin\phi + \frac{1}{2}V_{yy}\sin^2\phi + \frac{1}{2}V_{yz}\sin\phi + \frac{1}{2}V_{zx}\cos\phi + \frac{1}{2}V_{zy}\sin\phi + \frac{1}{2}V_{zz} \quad (1a)$$

With φ being the tool rotating angle and with the receiver antenna and transmitter antenna perpendicular to each other, the received voltage at the receiver antenna, represented with the upper index pp, is expressed as:

$$V^{pp} = -\frac{1}{2}V_{xx}\cos^2\phi - \frac{1}{2}V_{xy}\cos\phi\sin\phi - \frac{1}{2}V_{xz}\cos\phi - \frac{1}{2}V_{yx}\cos\phi\sin\phi - \frac{1}{2}V_{yy}\sin^2\phi - \frac{1}{2}V_{yz}\sin\phi + \frac{1}{2}V_{zx}\cos\phi + \frac{1}{2}V_{zy}\sin\phi + \frac{1}{2}V_{zz} \quad (1b)$$

FIGS. 2A and 2B both consist of structures in which transmitters and receivers are parallel or are perpendicular relative to each other. For ease of discussion, only tool 205-1 of FIG. 2A is discussed herein with respect to an embodiment implementing a tool that can mimic a different arrangement of transmitters and receivers, such as mimicking a triaxial tool. Tool 205-2 of FIG. 2B can also be implemented in a manner similar to or identical to the functional implementation of tool 205-1.

Figure 3A:
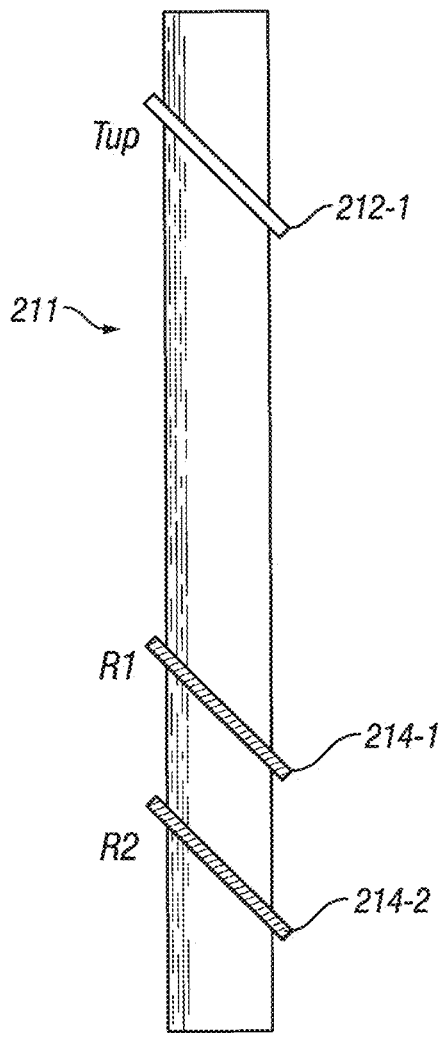
FIGS. 3A and 3B show the structure of FIG. 2A divided into two kinds of systems: an up-transmitter system and a down-transmitter system, according to various embodiments.
Figure 3B:
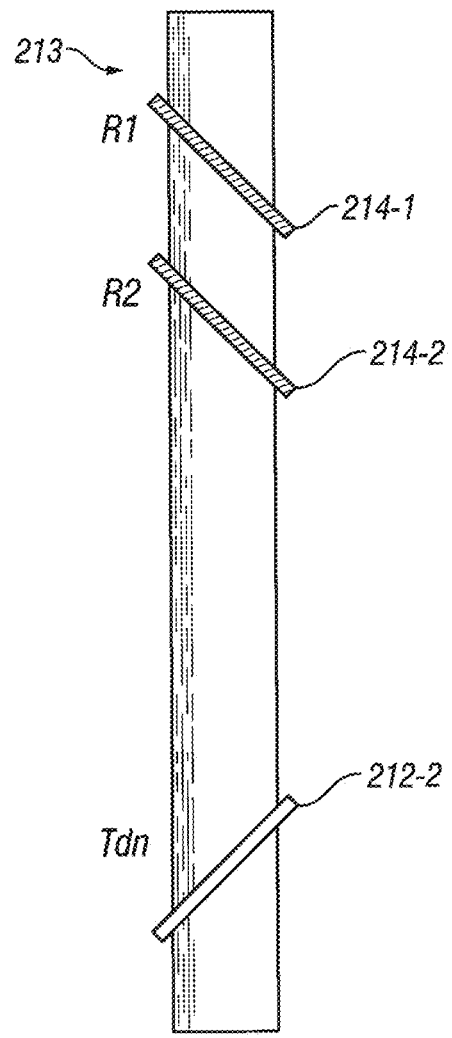

FIGS. 3A and 3B show the structure of FIG. 2A divided into two kinds of systems: an up-transmitter system (UTS) 211 and a down-transmitter system (DTS) 213. UTS 211 includes transmitter antenna 212-1 ($T_{UP}$), receiver antenna 214-1, and receiver antenna 214-2. DTS 213 includes transmitter antenna 212-2 ($T_{DN}$), receiver antenna 214-1, and receiver antenna 214-2. A reference point at position Z in the direction of measurement, such as in the direction of drilling, can be selected. With the reference point of measurement set, the shifting of UTS 211 and DTS 213 can be conducted in a process to implement the mimicking of a different arrangement of transmitter antennas and receiver antennas, such as mimicking a triaxial tool. The shifting can be simulated to determine the location of points to independently activate $T_{UP}$ and $T_{DN}$ and to collect signals at receiver antenna 214-1, at receiver antenna 214-2, at $T_{DN}$ when $T_{UP}$ is activated, and at $T_{UP}$ when $T_{DN}$ is activated, as tool reaches these locations. In a logging-while-drilling configuration, the implemented tool can be operated as a triaxial LWD tool.

Figure 4A:
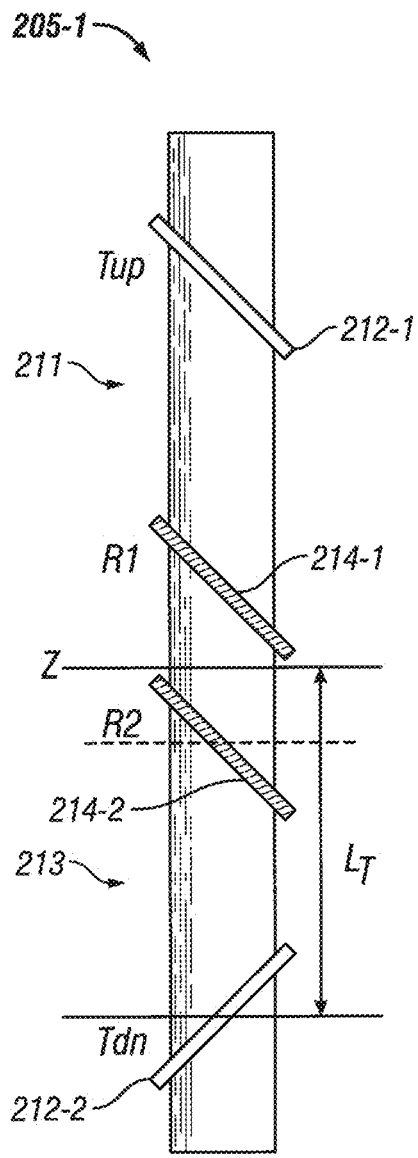
FIGS. 4A and 4B illustrate up shifting the down-transmitter system of FIG. 3B, according to various embodiments.
Figure 4B:
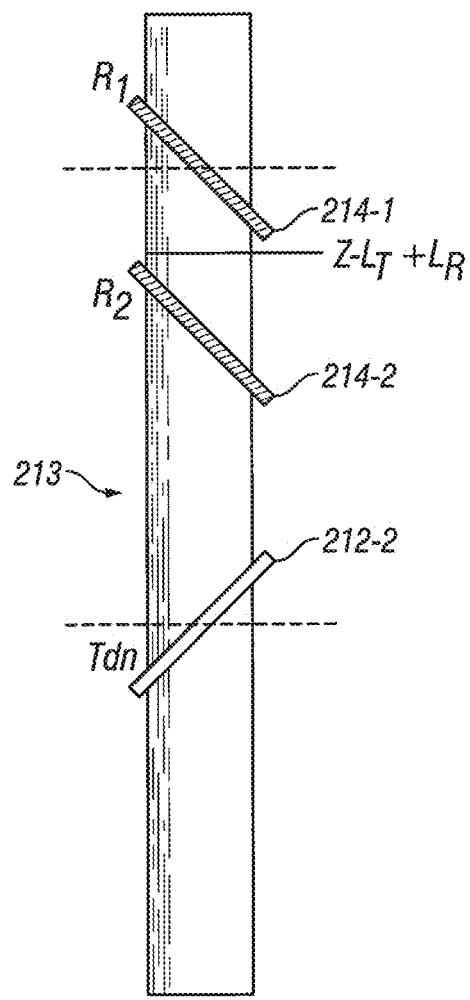

FIGS. 4A and 4B illustrate up shifting down-transmitter system 213 of FIG. 3B. FIG. 4A shows reference position Z located centrally between receiver antenna 214-1 and receiver antenna 214-2 on tool 205-1. DTS 213 is shifted up by distance $L_T$–$L_R$. $L_T$ and $L_R$ are positive values and the direction down from reference Z is in the positive direction. With the distance between receiver antennas 214-1 and 214-2 being $2L_R$=8 inches, $L_R$=4 inches. Other distances can be used for the distance $2L_R$ between receiver antennas 214-1 and 214-2. As shown in FIG. 4B, up shifting this symmetrical arrangement of transmitter antennas and receiver antennas by $L_T$–$L_R$ operatively locates receiver antenna 214-1 at the same position as transmitter antenna 212-1, $T_{UP}$ of UTS 211, and operatively locates transmitter antenna 212-2, $T_{DN}$ of DTS 213 at the same position as receiver antenna 214-2 of UTS 211.

Figure 5:
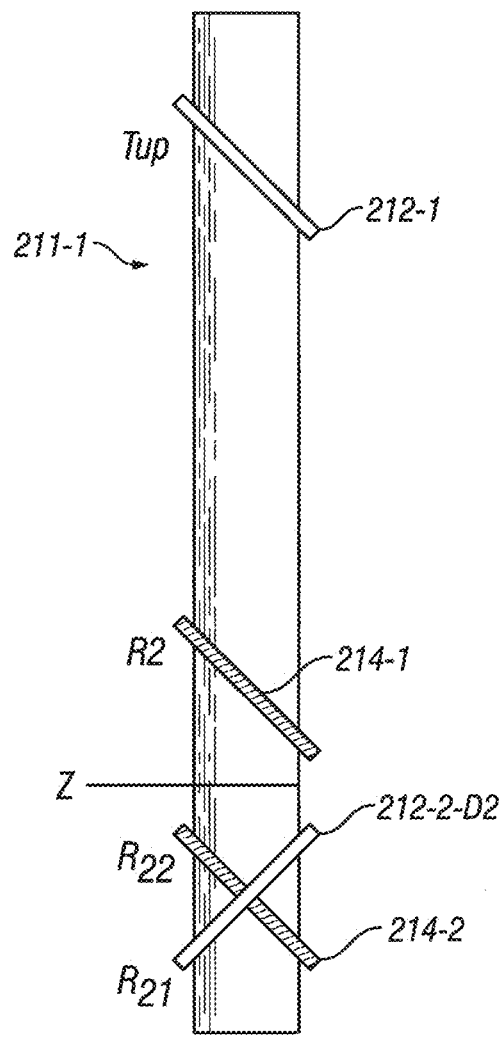
FIG. 5 shows a physical structure equivalent to a result of a shift operation on the tool of FIG. 4A, according to various embodiments.

FIG. 5 shows a physical structure equivalent to a result of a shift operation on tool 205-1 of FIG. 4A. Up shifting a down-transmitter system 213 of tool 205-1 is conducted to operatively generate an updated up-transmitter system 211-1. Using the reciprocity theory that provides for transmitter antenna 212-2, $T_{DN}$, to function as a receiver, up shifting DTS 213 by $L_T$–$L_R$ generates an updated UTS 211-1 equivalent to a physical structure shown in FIG. 5. Updated UTS 211-1 operatively includes transmitter antenna 212-1 $T_{UP}$, receiver antenna 214-1, and two receivers (transmitter antenna 212-2-D2 as receiver antenna $R_{21}$ and receiver antenna 214-2 as receiver antenna $R_{22}$) perpendicular to each other at the position of antenna receiver 214-2 for UTS 211. The D2 with respect to transmitter 212-2 indicates a receiver antenna that is mimicked by using transmitter antenna 212-2 at a shifted location. Updated UTS 211-1 is provided by measurements taken at locations defined by the effective shifting demonstrated above along the longitudinal axis 207-1 of tool 205-1. When transmitter antenna 212-1 is activated with transmitter antenna 212-2, $T_{DN}$, at the selected reference point Z plus $L_R$ (positive moving downhole from reference point Z), the voltage received at transmitter antenna 212-2, $T_{DN}$, as a receiver is $V_{TUP\ R21}$. When transmitter antenna 212-1 is activated with receiver antenna 214-2 at the selected reference point Z plus $L_R$, the voltage received at receiver antenna 214-2 is $V_{TUP\ R22}$.

Figure 6A:
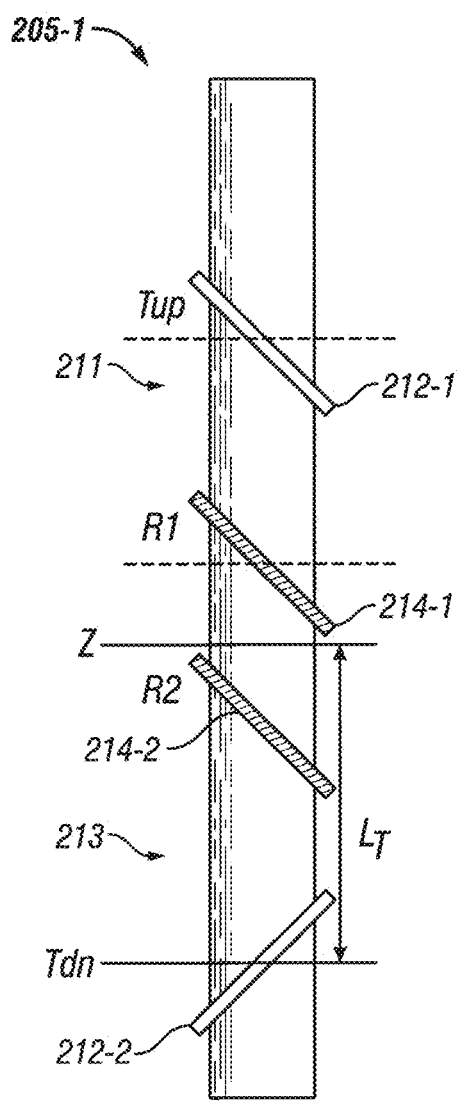
FIGS. 6A and 6B illustrate up shifting the down-transmitter system of FIG. 3B, according to various embodiments.
Figure 6B:
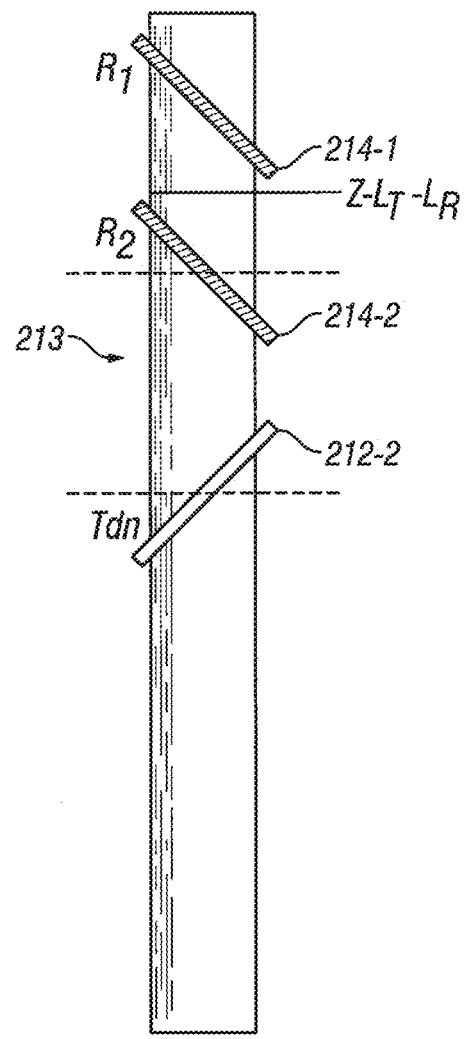

FIGS. 6A and 6B illustrate up shifting down-transmitter system 213 of FIG. 3B. FIG. 6A shows reference position Z located centrally between receiver antenna 214-1 and receiver antenna 214-2 of tool 205-1. DTS 213 is shifted up by distance $L_T$+$L_R$. $L_T$ and $L_R$ are positive values and the direction down from reference Z is in the positive direction. With the distance between receiver antennas 214-1 and 214-2 being $2L_R$=8 inches, $L_R$=4 inches. Other distances can be used for the distance $L_R$ between receiver antennas 214-1 and 214-2. As shown in FIG. 6B, up shifting this symmetrical arrangement of transmitter antennas and receiver antennas by $L_T+L_R$ operatively locates receiver antenna 214-2 at the same position as transmitter antenna 212-1, $T_{UP}$ of UTS 211, and operatively locates transmitter antenna 212-2, $T_{DN}$ of DTS 213 at the same position as receiver antenna 214-1 of UTS 211.

Figure 7:
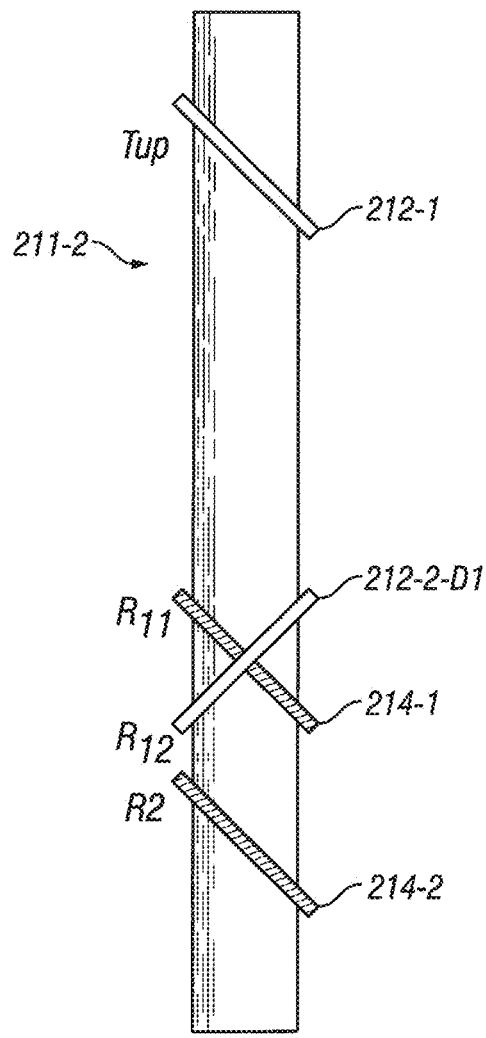
FIG. 7 shows a physical structure equivalent to a result of a shift operation on the tool of FIG. 6A, in accordance with various embodiments.

FIG. 7 shows a physical structure equivalent to a result of a shift operation on tool 205-1 of FIG. 6A. Up shifting a down-transmitter system 213 of tool 205-1 is conducted to operatively generate an updated up-transmitter system 211-2. Using the reciprocity theory that provides for transmitter antenna 212-2, $T_{DN}$, to function as a receiver, up shifting DTS 213 by $L_T+L_R$ generates an updated UTS 211-2 equivalent to a physical structure shown in FIG. 7. Updated UTS 211-2 operatively includes transmitter antenna 212-1 $T_{UP}$, receiver antenna 214-2, and two receivers (transmitter antenna 212-2-D1 as receiver antenna $R_{12}$ and receiver antenna 214-1 as receiver antenna $R_{11}$) perpendicular to each other at the position of antenna receiver 214-1 for UTS 211. The D1 with respect to transmitter antenna 212-2 indicates a receiver that is mimicked by using transmitter antenna 212-2 at a shifted location. Updated UTS 211-2 is provided by measurements taken at locations defined by the effective shifting demonstrated above along the longitudinal axis 207-1 of tool 205-1. When transmitter antenna 212-1 is activated with transmitter antenna 212-2, $T_{DN}$, at the selected reference point Z minus $L_R$, the voltage received at transmitter antenna 212-2, $T_{DN}$, as a receiver is $V_{TUP\ R12}$. When transmitter antenna 212-1 is activated with receiver antenna 214-1 at the selected reference point Z minus $L_R$, the voltage received at receiver antenna 214-1 is $V_{TUP\ R11}$.

Figure 8:
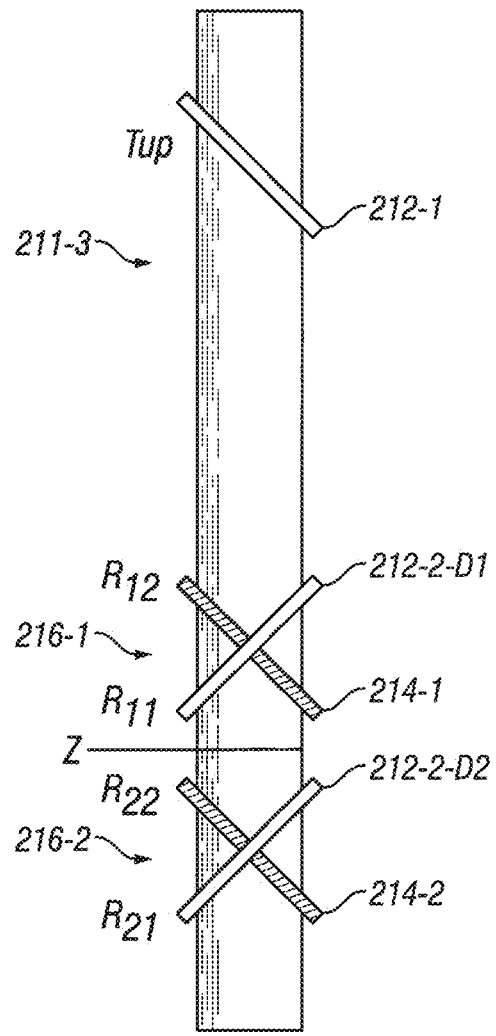
FIG. 8 shows a physical structure equivalent to a result of shift operations on the tool of FIGS. 4A and 6A, in accordance with various embodiments.

FIG. 8 shows a physical structure equivalent to a result of shift operations on tool 205-1 of FIGS. 4A and 6A. FIG. 8 shows an updated up-transmitter system 211-3 that combines shifting reflected in FIGS. 4B and 6B. Updated UTS 211-3 operatively includes tilted transmitter antenna 212-1, $T_{UP}$, and two sets of perpendicular receivers. One set 216-1 of perpendicular receivers is realized with transmitter antenna 212-2-D1 as receiver antenna $R_{12}$ and receiver antenna 214-1 as receiver antenna $R_{11}$. The other set 216-2 of perpendicular receivers is realized with transmitter antenna 212-2-D2 as receiver antenna $R_{21}$ and receiver antenna 214-2 as receiver antenna $R_{22}$. The D1 and D2 with respect to transmitter 212-2 each indicate a receiver that is mimicked by using transmitter antenna 212-2 at a shifted location. The two sets 216-1 and 216-2 of perpendicular receiver antennas maintain the symmetry of tool 205-1. The two sets 216-1 and 216-2 are separated from each other by $2L_R$. The two sets can be operatively provided by selectively activating $T_{UP}$ and selectively collecting signals at two receiver antennas and at a transmitter antenna as tool 205-1 becomes positioned at specific distances based on shifted distances from a reference point. The reference point may be central to the two receiving antennas.

Figure 9A:
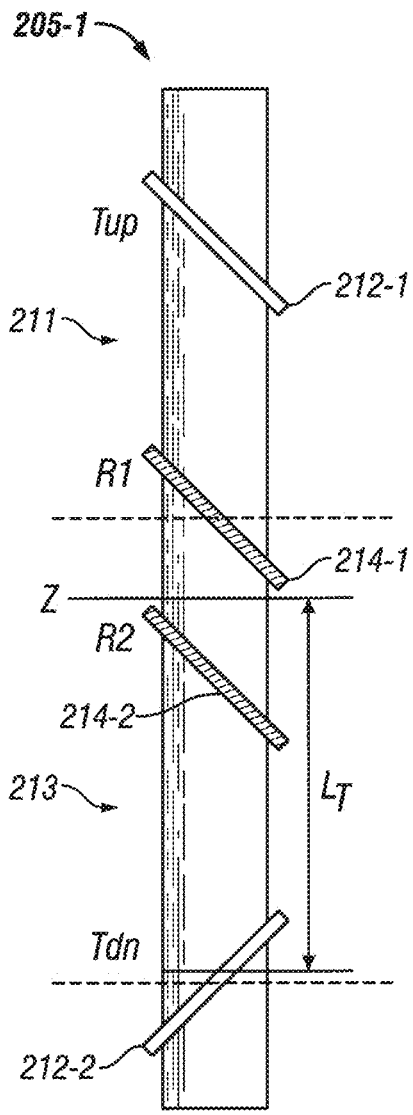
FIGS. 9A and 9B illustrate down shifting the up-transmitter system of FIG. 3A, in accordance with various embodiments.
Figure 9B:
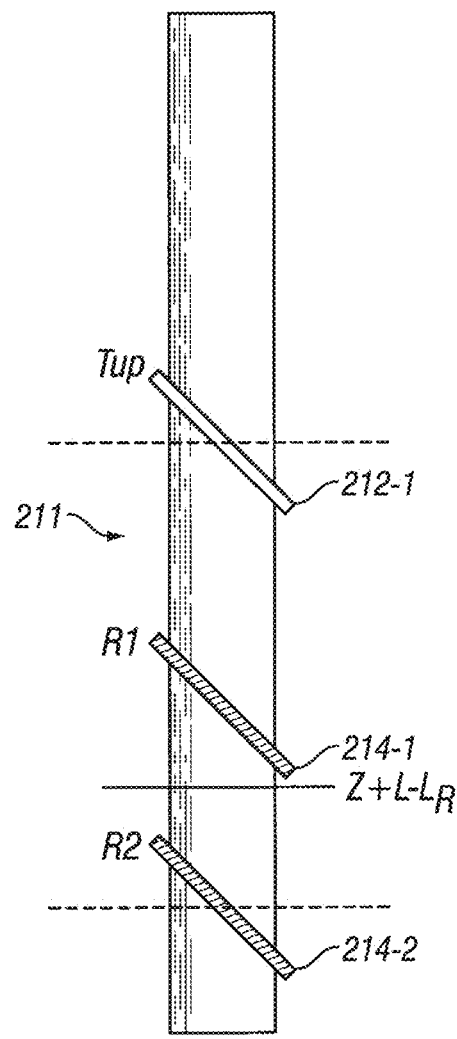

FIGS. 9A and 9B illustrate down shifting up-transmitter system 211 of FIG. 3A. FIG. 9A shows reference position Z located centrally between receiver antenna 214-1 and receiver antenna 214-2 of tool 205-1. UTS 211 is shifted down by distance $L_T-L_R$. $L_T$ and $L_R$ are positive values and the direction down from reference Z is in the positive direction. With the distance between receiver antennas 214-1 and 214-2 being $2L_R=8$ inches, $L_R=4$ inches. Other distances can be used for the distance $2L_R$ between receiver antennas 214-1 and 214-2. As shown in FIG. 9B, down shifting this symmetrical arrangement of transmitter antennas and receiver antennas by $L_T-L_R$ operatively locates receiver antenna 214-2 of UTS 211 at the same position as transmitter antenna 212-2, $T_{DN}$ of DTS 213, and operatively locates transmitter antenna 212-1, $T_{UP}$ of UTS 211, at the same position as receiver antenna 214-1 of DTS 213.

Figure 10:
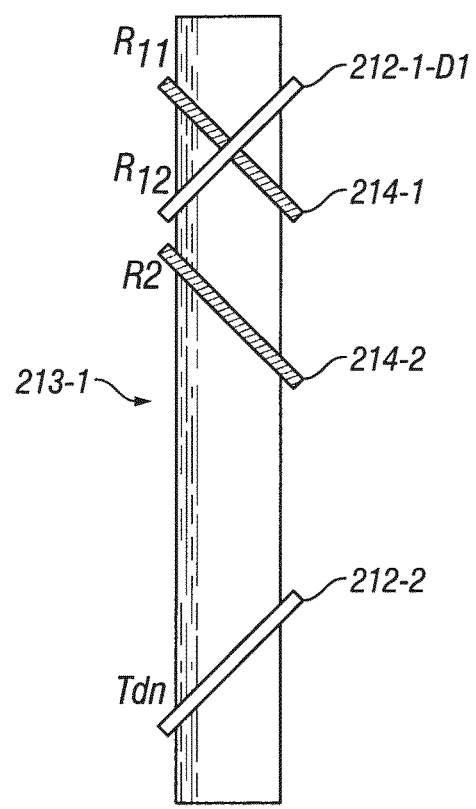
FIG. 10 shows a physical structure equivalent to a result of a shift operation on the tool of FIG. 9A, in accordance with various embodiments.

FIG. 10 shows a physical structure equivalent to a result of a shift operation on tool 205-1 of FIG. 9A. Down shifting an up-transmitter system 211 of tool 205-1 is conducted to generate an updated down-transmitter system 213-1. Using reciprocity theory that provides for transmitter antenna 212-1, $T_{UP}$, to function as a receiver, down shifting UTS 211 by $L_T-L_R$ generates an updated DTS 213-1 equivalent to the physical structure shown in FIG. 10. Updated DTS 213-1 operatively includes transmitter antenna 212-2, $T_{DN}$, receiver antenna 214-2, and two receivers (transmitter antenna 212-1-D1, $T_{UP}$, as receiver antenna $R_{11}$ and receiver antenna 214-1 as receiver antenna $R_{11}$) perpendicular to each other at the position of antenna receiver 214-1 for DTS 213, since transmitter antenna 212-1 is perpendicular to transmitter 212-2. The D1 with respect to transmitter antenna 212-1 indicates a receiver that is mimicked by using transmitter antenna 212-1 at a shifted location. Updated DTS 213-1 is provided by measurements taken at locations defined by the effective shifting demonstrated above along the longitudinal axis 207-1 of tool 205-1. When transmitter antenna 212-2 is activated with transmitter antenna 212-1, $T_{UP}$, at the selected reference point Z minus $L_R$, the voltage received at transmitter 212-1, $T_{UP}$, as a receiver is $V_{TDN\ R12}$. When transmitter antenna 212-2 is activated with receiver antenna 214-1 at the selected reference point Z minus $L_R$, the voltage received at receiver antenna 214-1 is $V_{TUP\ R11}$.

FIGS. 11A and 11B illustrate down shifting up-transmitter system 211 of FIG. 3A. FIG. 11A shows reference position Z located centrally between receiver antenna 214-1 and receiver antenna 214-2. UTS 211 is shifted down by distance $L_T+L_R$. $L_T$ and $L_R$ are positive values and the direction down from reference Z is in the positive direction. With the distance between receiver antennas 214-1 and 214-2 being $2L_R=8$ inches, $L_R=4$ inches. Other distances can be used for the distance $2L_R$ between receiver antennas 214-1 and 214-2. As shown in FIG. 11B, down shifting this symmetrical arrangement of transmitter antennas and receiver antennas by $L_T+L_R$ operatively locates receiver antenna 214-1 of UTS 211 at the same position as transmitter antenna 212-1, $T_{DN}$ of DTS 213, and operatively locates transmitter antenna 212-1, $T_{UP}$, of UTS 211 at the same position as receiver antenna 214-2 of DTS 213.

Figure 12:
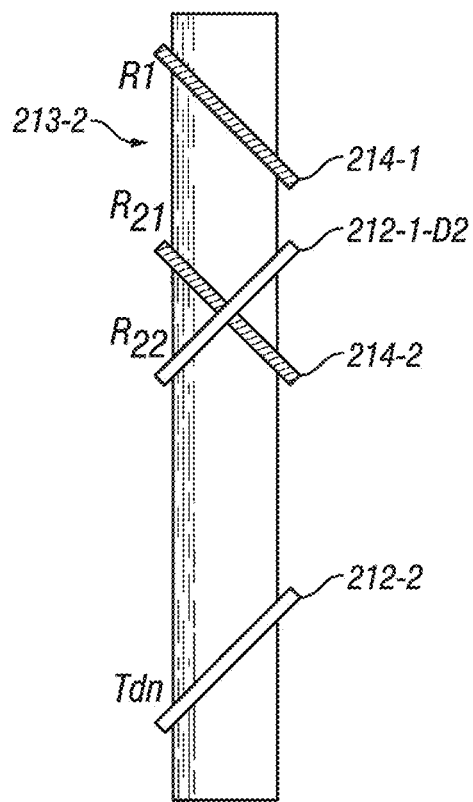
FIG. 12 shows a physical structure equivalent to a result of a shift operation on the tool of FIG. 11A, in accordance with various embodiments.

FIG. 12 shows a physical structure equivalent to a result of a shift operation on tool 205-1 of FIG. 11A. Down shifting up-transmitter system 211 is conducted to generate an updated down-transmitter system 213-2. Using reciprocity theory that provides for transmitter antenna 212-1, $T_{UP}$, to function as a receiver, down shifting UTS 211 by $L_T+L_R$ generates an updated DTS 213-2, shown in FIG. 12. Updated DTS 213-2 operatively includes transmitter antenna 212-2, $T_{DN}$, receiver antenna 214-1, and two receivers (transmitter antenna 212-1, $T_{UP}$, as receiver antenna $R_{21}$ and receiver antenna 214-2 as receiver antenna $R_{22}$) perpendicular to each other at the position of antenna receiver 214-2 for DTS 213, since transmitter antenna 212-1 is perpendicular to transmitter antenna 212-2. The D2 with respect to transmitter antenna 212-1 indicates a receiver that is mimicked by using transmitter antenna 212-1 at a shifted location. Updated DTS 213-2 is provided by measurements taken at locations defined by the effective shifting demonstrated above along the longitudinal axis 207-1 of tool 205-1. When transmitter antenna 212-2 is activated with transmitter antenna 212-1, $T_{UP}$, at the selected reference point Z plus $L_R$, the voltage received at transmitter antenna 212-1, $T_{UP}$, as a receiver is $V_{TDN\ R21}$. When transmitter antenna 212-2 is activated with receiver antenna 214-2 at the selected reference point Z plus $L_R$, the voltage received at receiver antenna 214-1 is $V_{TUP\_R22}$.

Figure 13:
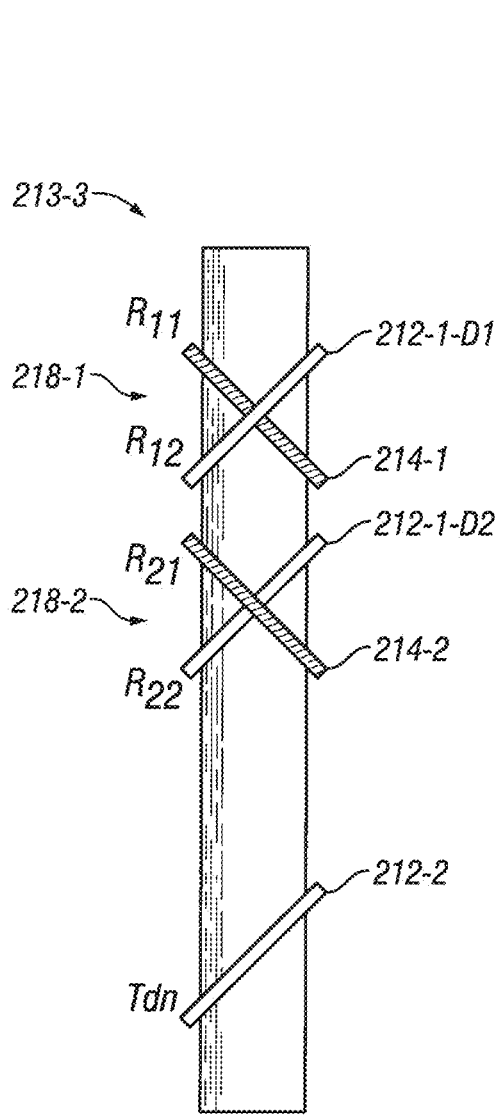
FIG. 13 shows a physical structure equivalent to a result of shift operations on the tool of FIGS. 9A and 11A, according to various embodiments.

FIG. 13 shows a physical structure equivalent to a result of shift operations on tool 205-1 of FIGS. 9A and 11A. FIG. 13 shows an updated down-transmitter system 213-3 that combines shifting reflected in FIGS. 9B and 11B. Updated DTS 213-3 operatively includes tilted transmitter antenna 212-2, $T_{DN}$, and two sets of perpendicular receivers. One set 218-1 of perpendicular receivers is realized with transmitter antenna 212-1-D1 as receiver antenna $R_{12}$ and receiver antenna 214-1 as receiver antenna $R_{11}$. The other set 218-2 of perpendicular receivers is realized with transmitter antenna 212-1-D2 as receiver antenna $R_{21}$ and receiver antenna 214-2 as receiver antenna $R_{22}$. The D1 and D2 with respect to transmitter antenna 212-1 each indicate a receiver that is mimicked by using transmitter antenna 212-2 at a shifted location. The two sets 218-1 and 218-2 of perpendicular receivers maintain the symmetry of tool 205-1. The two sets 218-1 and 218-2 are separated from each other by $2L_R$. The two sets are operatively provided by selectively activating $T_{DN}$ and selectively collecting signals at two receiver antennas and at a transmitter antenna as tool 205-1 becomes positioned at specific distances based on shifted distances from a reference point. The reference point may be central to the two receiving antennas.

Figure 14:
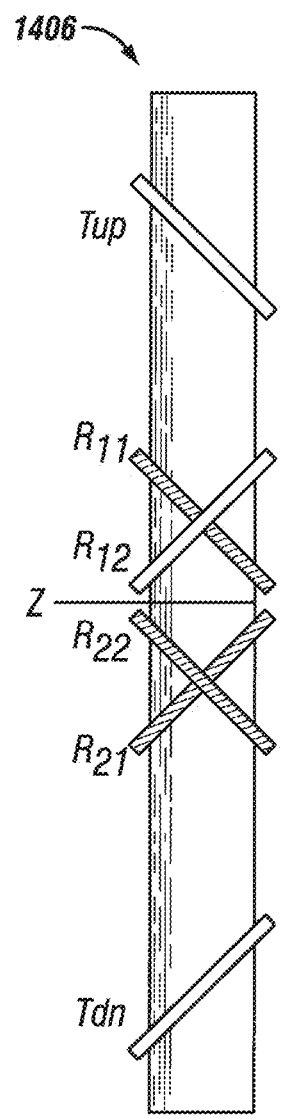
FIG. 14 shows a physical structure equivalent to a result of combined shift operations on the tool of FIGS. 4A, 6A, 9A, and 11A, according to various embodiments.

FIG. 14 shows a physical structure 1406 equivalent to a result of combined shift operations on tool 205-1 of FIGS. 4A, 6A, 9A, and 11A. The physical structure of FIG. 14 can be mimicked from combining the effective down shifting of up-transmitter system 211 of tool 205-1 and the up shifting of down-transmitter system 213 of tool 205-1 as reflected in FIGS. 4A-B, 6A-B, 9A-B, and 11A-B. The various shiftings are provided by activating one transmitter antenna with the other transmitter antenna located at each of the receiver antenna locations relative to a reference position Z. The operatively generated tool equivalent to the physical structure shown in FIG. 14 can provide an updated azimuthal deep resistivity (ADR) tool with perpendicular receiver antennas. Measurements of updated tool 205-1 to the equivalent structure of FIG. 14 can be transformed into a triaxial measurement. Such triaxial measurements can be made as triaxial LWD measurements using various transformations.

Figure 15C:
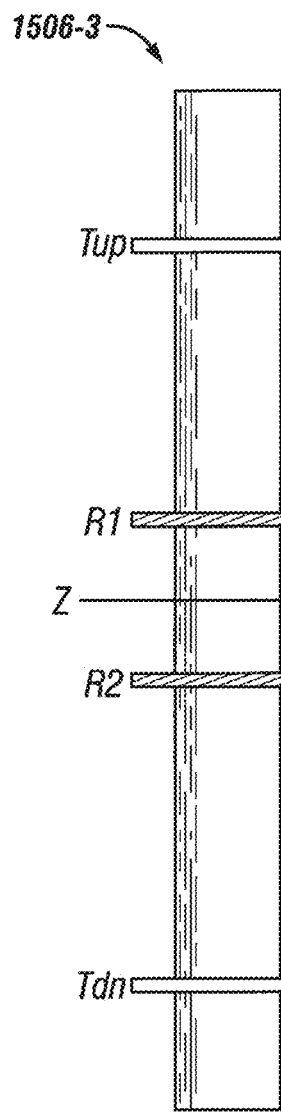

FIGS. 15A-15D shows examples of different physical structures that can be realized in measurement functions by an embodiment of a tool, having a fixed arrangement of transmitters and receivers, operated with respect to shifting positions of the transmitters relative to the receivers. The received responses at these shifted positions can be used to operatively make transformations to the tool measurements for it to function as different arrangements of transmitters and receivers. Such transformation can be accomplished through processing measurements made by the tool, having the fixed arrangement, at locations correlated to shifting the tool with respect to a reference location relative to the fixed arrangement of transmitters and receivers. FIG. 15A shows an equivalent physical structure 1506-1 for obtaining measurements that can be provided by the selected measurements of tool 205-1 of FIG. 2A taken at selected locations relative to a selected reference that provides the voltage measurements $V_{TdnR11}$, $V_{TdnR12}$, $V_{TdnR21}$, and $V_{TdnR22}$. The transformations $V_{TdnR11}+V_{TdnR12}$ and $V_{TdnR21}+V_{TdnR22}$ provide the measurements that could be obtained by a physical structure shown in FIG. 15A.

Using reciprocity theory and considering tool's rotation, the measurements equivalent to the structure shown in FIG. 15A can be made equal to measurements equivalent to structure 1506-2 shown in FIG. 15B. Structure 1506-2 in FIG. 15B can be physically realized using a conventional ADR tool without a process of measurements that operatively shifts the tool sensors. A conventional ADR sensor tool typically consists of two central tilted receiver antennas, and three pairs of transmitter antennas arranged symmetrically with respect to the middle of the receiver antennas. The inner transmitter antenna pairs can have a short spacing (for example, 16 inches) and are coaxial non-tilted antennas as shown in FIG. 15B. However, the outer transmitter antenna pairs (not shown in FIG. 15B) can have 32 and 48 inch spacing and can be tilted. With this arrangement for a conventional ADR sensor tool in a non homogenous layered medium, it generally is not possible to get an accurate compensated resistivity measurement.

Figure 15D:
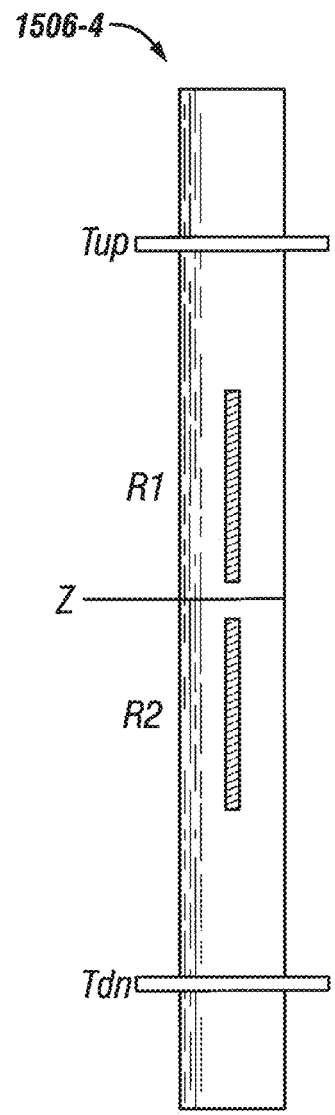

The average of voltages acquired by an ADR tool, as structured in FIG. 15B, is the measurement obtainable by a traditional LWD tool, which can be arranged with structure 1506-3 as shown in FIG. 15C, without a process of measurements that operatively shifts the tool sensors. FIG. 15D shows a physical tool structure 1506-4 that can provide measurements that are the difference of the measurement of ADR tool shown in FIG. 15B and the average measurement of the traditional LWD tool shown in FIG. 15C. Measurements of the physical tool shown in FIG. 15D are sensitive to boundary positions. The measurements provided by the physical structures shown in FIGS. 15A-15D can be attained by measurements of tool 205-1 of FIG. 2A appropriately shifted with the measurements transformed by adding and/or subtracting various of the measurements taken by tool 205-1.

The received voltage of structure shown in FIG. 15C is $$V = V_{zz}. \quad (2)$$

The voltage of structure shown in FIG. 15D is $$V = \frac{1}{2}V_{zx}\cos\phi + \frac{1}{2}V_{zy}\sin\phi. \quad (3)$$

Figure 16A:
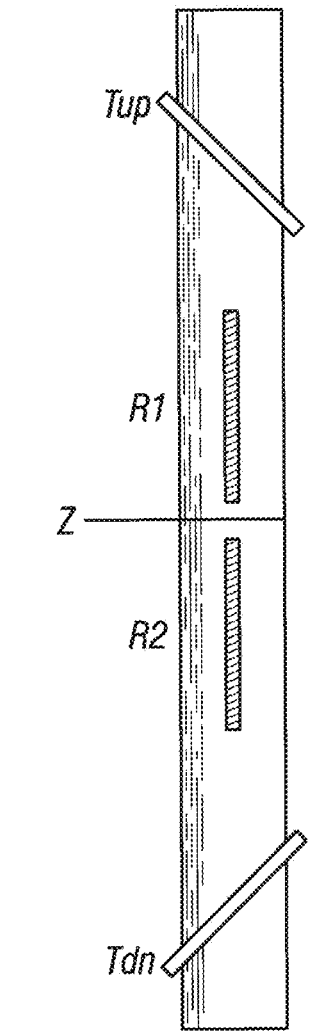
FIG. 16A shows a physical structure whose measurements can be obtained by the tool of FIG. 2A by selectively taking measurements at locations relative to a reference location such that these measurements mimic the physical structure, according to various embodiments.

FIG. 16A shows a physical structure 1606-1 whose measurements can be obtained by tool 205-1 of FIG. 2A by selectively taking measurements at locations relative to a reference location such that these measurements can be transformed to mimic physical structure 1606-1. The measurements can be obtained by tool 205-1 resulting from selectively activating one transmitter with another transmitter located a location at which a receiver of tool 205-1 also acquires a signal from another activation of the same transmitter. These measurements correlated to specific locations of the arrangement of transmitters and receivers of tool 205-1 can be referred to as shift measurements. The shift measurements of tool 205-1 can provide the voltage measurements $V_{TdnR11}$, $V_{TdnR12}$, $V_{TdnR21}$, and $V_{TdnR22}$ with respect to a reference location. By making the transformations $V_{TdnR11}-V_{TdnR12}$ and $V_{TdnR21}-V_{TdnR22}$, measurements are acquired that are obtainable by the physical structure 1606-1 shown in FIG. 16A.

Figure 16B:
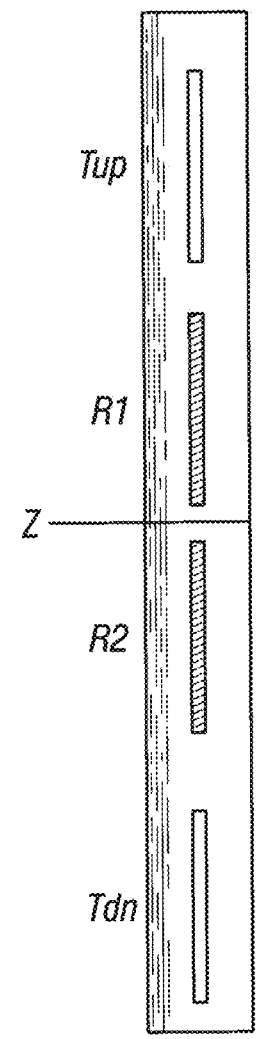
FIG. 16B shows a physical structure whose measurement function can be attained by the tool of FIG. 2A by selectively taking measurements at locations relative to a reference location such that these measurements mimic the physical structures of FIGS. 16A and 15D.

FIG. 16B shows a physical structure 1606-2 whose measurement function can be attained by tool 205-1 of FIG. 2A by selectively taking measurements at locations relative to a reference location such that these measurements mimic the physical structures of FIGS. 16A and 15D. The average of voltages measured in mimicking the structure shown in FIG. 16A can be obtained by a measurement using the physical structure shown in FIG. 15D. The difference between the measurement of the structure shown in FIG. 16A and the measurement of the structure shown in FIG. 15D is the measurement obtainable by the physical structure 1606-2 shown in FIG. 16B, whose measurements yield $$V = \frac{1}{2}V_{xx}\cos^2\phi + \frac{1}{2}V_{yy}\sin^2\phi. \quad (4)$$

Combining the measurements made to effectively copy the measurements of the physical tool structures shown in FIGS. 15C, 15D, and 16B and considering the tool's rotation, a triaxial tool's measurement, which may be applied to LWD applications, can be obtained from ADR measurements using tilted transmitters.

After performing measurements to operatively shift tool 205-1 of FIG. 2A, the collected measurements can be made to equivalently correspond to the structure of shown in FIG. 14. The measurements performing the effective shifting of tool 205-1 provide triaxial measurements. Such a tool can be used in LWD applications. With the azimuthal angle set to 0°, 45°, 90°, 135°, 180°, 225°, 270°, and 315°, equation (1a) and (1b) can be expressed as $$V^{pr}(0) = \frac{1}{2}V_{xx} + \frac{1}{2}V_{xz} + \frac{1}{2}V_{zx} + \frac{1}{2}V_{zz} \quad (5a)$$

$$V^{pr}(45) = \frac{1}{4}V_{xx} + \frac{1}{4}V_{xy} + \frac{\sqrt{2}}{4}V_{xz} + \frac{1}{4}V_{yx} + \frac{1}{4}V_{yy} + \frac{\sqrt{2}}{4}V_{yz} + \frac{\sqrt{2}}{4}V_{zx} + \frac{\sqrt{2}}{4}V_{zy} + \frac{1}{2}V_{zz} \quad (5b)$$

$$V^{pr}(90) = \frac{1}{2}V_{yy} + \frac{1}{2}V_{yz} + \frac{1}{2}V_{zy} + \frac{1}{2}V_{zz} \quad (5c)$$

$$V^{pr}(135) = \frac{1}{4}V_{xx} - \frac{1}{4}V_{xy} - \frac{\sqrt{2}}{4}V_{xz} - \frac{1}{4}V_{yx} + \frac{1}{4}V_{yy} + \frac{\sqrt{2}}{4}V_{yz} - \frac{\sqrt{2}}{4}V_{zx} + \frac{\sqrt{2}}{4}V_{zy} + \frac{1}{2}V_{zz} \quad (5d)$$

$$V^{pr}(180) = \frac{1}{2}V_{xx} - \frac{1}{2}V_{xz} - \frac{1}{2}V_{zx} + \frac{1}{2}V_{zz} \quad (5e)$$

$$V^{pr}(225) = \frac{1}{4}V_{xx} + \frac{1}{4}V_{xy} - \frac{\sqrt{2}}{4}V_{xz} + \frac{1}{4}V_{yx} + \frac{1}{4}V_{yy} - \frac{\sqrt{2}}{4}V_{yz} - \frac{\sqrt{2}}{4}V_{zx} - \frac{\sqrt{2}}{4}V_{zy} + \frac{1}{2}V_{zz} \quad (5f)$$

$$V^{pr}(270) = \frac{1}{2}V_{yy} - \frac{1}{2}V_{yz} - \frac{1}{2}V_{zy} + \frac{1}{2}V_{zz} \quad (5g)$$

$$V^{pr}(315) = \frac{1}{4}V_{xx} - \frac{1}{4}V_{xy} + \frac{\sqrt{2}}{4}V_{xz} + \frac{1}{4}V_{yx} + \frac{1}{4}V_{yy} - \frac{\sqrt{2}}{4}V_{yz} + \frac{\sqrt{2}}{4}V_{zx} - \frac{\sqrt{2}}{4}V_{zy} + \frac{1}{2}V_{zz} \quad (5h)$$

$$V^{pr}(0) = -\frac{1}{2}V_{xx} - \frac{1}{2}V_{xz} + \frac{1}{2}V_{zx} + \frac{1}{2}V_{zz} \quad (6a)$$

$$V^{pp}(45) = -\frac{1}{4}V_{xx} - \frac{1}{4}V_{xy} - \frac{\sqrt{2}}{4}V_{xz} - \frac{1}{4}V_{yx} - \frac{1}{4}V_{yy} - \frac{\sqrt{2}}{4}V_{yz} + \frac{\sqrt{2}}{4}V_{zx} + \frac{\sqrt{2}}{4}V_{zy} + \frac{1}{2}V_{zz} \quad (6b)$$

$$V^{pp}(90) = -\frac{1}{2}V_{yy} - \frac{1}{2}V_{yz} + \frac{1}{2}V_{zy} + \frac{1}{2}V_{zz} \quad (6c)$$

$$V^{pp}(45) = -\frac{1}{4}V_{xx} + \frac{1}{4}V_{xy} + \frac{\sqrt{2}}{4}V_{xz} + \frac{1}{4}V_{yx} - \frac{1}{4}V_{yy} - \frac{\sqrt{2}}{4}V_{yz} - \frac{\sqrt{2}}{4}V_{zx} + \frac{\sqrt{2}}{4}V_{zy} + \frac{1}{2}V_{zz} \quad (6d)$$

$$V^{pp}(180) = -\frac{1}{2}V_{xx} + \frac{1}{2}V_{xz} - \frac{1}{2}V_{zx} + \frac{1}{2}V_{zz} \quad (6e)$$

$$V^{pp}(225) = -\frac{1}{4}V_{xx} - \frac{1}{4}V_{xy} + \frac{\sqrt{2}}{4}V_{xz} - \frac{1}{4}V_{yx} - \frac{1}{4}V_{yy} + \frac{\sqrt{2}}{4}V_{yz} - \frac{\sqrt{2}}{4}V_{zx} - \frac{\sqrt{2}}{4}V_{zy} + \frac{1}{2}V_{zz} \quad (6f)$$

$$V^{pp}(270) = -\frac{1}{2}V_{yy} + \frac{1}{2}V_{yz} - \frac{1}{2}V_{zy} + \frac{1}{2}V_{zz} \quad (6g)$$

$$V^{pp}(315) = -\frac{1}{4}V_{xx} + \frac{1}{4}V_{xy} - \frac{\sqrt{2}}{4}V_{xz} + \frac{1}{4}V_{yx} - \frac{1}{4}V_{yy} + \frac{\sqrt{2}}{4}V_{yz} + \frac{\sqrt{2}}{4}V_{zx} - \frac{\sqrt{2}}{4}V_{zy} + \frac{1}{2}V_{zz} \quad (6h)$$

From equations 5a-5h and 6a-6h, the tensor voltage for each transmitter and receiver position combination in FIG. 14 can be solved. For example, from equations (5a), (6a), (5e), and (6e), the following linear equations are obtained:

$$\begin{bmatrix} 1 & 1 & 1 & 1 \\ -1 & -1 & 1 & 1 \\ 1 & -1 & -1 & 1 \\ -1 & 1 & -1 & 1 \end{bmatrix} \begin{bmatrix} V_{xx} \\ V_{xz} \\ V_{zx} \\ V_{zz} \end{bmatrix} = 2 \begin{bmatrix} V^{pr}(0) \\ V^{pp}(0) \\ V^{pr}(180) \\ V^{pp}(180) \end{bmatrix}. \quad (7a)$$

For example, from equations (5c), (6c), (5g), and (6g), the following linear equations are obtained:

$$\begin{bmatrix} 1 & 1 & 1 & 1 \\ -1 & -1 & 1 & 1 \\ 1 & -1 & -1 & 1 \\ -1 & 1 & -1 & 1 \end{bmatrix} \begin{bmatrix} V_{yy} \\ V_{yz} \\ V_{zy} \\ V_{zz} \end{bmatrix} = 2 \begin{bmatrix} V^{pr}(90) \\ V^{pp}(90) \\ V^{pr}(270) \\ V^{pp}(270) \end{bmatrix} \quad (7b)$$

Solving equations (7a) and (7b), most of the components of voltage matrix can be obtained except $V_{xy}$ and $V_{yx}$ $$\overline{V} = \begin{bmatrix} V_{xx} & ? & V_{xz} \\ ? & V_{yy} & V_{yz} \\ V_{zx} & V_{zy} & V_{zz} \end{bmatrix}. \quad (8)$$

The components $V_{xy}$ and $V_{yx}$ are not obtained, but $$\frac{V_{xy} + V_{yx}}{2}$$

can be obtained, if the solved components in (8) are substituted into any equation of (5b), (5d), (5f), (5h), (6b), (6d), (60 and (6h). The voltage matrix can be expressed as $$\overline{V} = \begin{bmatrix} V_{xx} & \dfrac{V_{xy}+V_{yx}}{2} & V_{xz} \\ \dfrac{V_{xy}+V_{yx}}{2} & V_{yy} & V_{yz} \\ V_{zx} & V_{zy} & V_{zz} \end{bmatrix} \quad (9)$$

Though the XY and YX components in equation (9) may not be completely accurate, they are sufficient, since a coordinate system can be selected to let $V_{xy}$, $V_{yx}$, $V_{zy}$, and $V_{yz}$ be 0. As such, the matrix becomes $$\overline{V} = \begin{bmatrix} V_{xx} & 0 & V_{xz} \\ 0 & V_{yy} & 0 \\ V_{zx} & 0 & V_{zz} \end{bmatrix} \quad (10)$$

After shifting, the voltage matrix for each transmitter and receiver position combination, $\nabla_{tup}^{R_1}$, $\nabla_{tup}^{R_2}$, $\nabla_{tdn}^{R_1}$, and $\nabla_{tdn}^{R_2}$, can be obtained. These components can be used in the matrix to conduct a triaxial LWD interpretation to determine horizontal resistivity, $R_h$, and vertical resistivity $R_v$.

Computation of the voltage matrix discussed above is based on the azimuthal angle being known. However, the true azimuthal angle is not obtained directly from field data. In order to obtain the azimuthal angle, measurements are taken with a full rotation partitioned into a number of bins such that measurements are taken as the tool shifts from one bin to another. With a coordinate system selected such that $V_{xy}$, $V_{yx}$, $V_{zy}$, and $V_{yz}$ each equal 0, equations (1a) and (1b) can be rewritten as $$V^{prl} = \dfrac{V_{xx}-V_{yy}}{4}\cos 2\phi + \dfrac{V_{xz}+V_{zx}}{4}\cos\phi + \dfrac{2V_{zz}+V_{yy}+V_{xx}}{4} \quad (11a)$$

$$V^{pp} = \dfrac{-V_{xx}+V_{yy}}{4}\cos 2\phi - \dfrac{V_{xz}-V_{zx}}{4}\cos\phi + \dfrac{2V_{zz}-V_{yy}-V_{xx}}{4} \quad (11b)$$

Formulae (12a) and (12b) can be used to perform curve fitting to match formulae (11a) and (11b), from which a bin shift azimuthal angle can be obtained.

$$V^{prl}(i)=A^{prl}\cos(2\phi_i+2\phi)+B^{prl}\cos(\phi_i+\phi)+C^{prl},$$
$$(i=1,\ldots,N) \quad (12a)$$

$$V^{pp}(i)=A^{pp}\cos(2\phi_i+2\phi)+B^{pp}\cos(\phi_i+\phi)+C^{pp},$$
$$(i=1,\ldots,N) \quad (12b)$$

where $A^{prl}$, $B^{prl}$, $C^{prl}$, $A^{pp}$, $B^{prl}$, and $C^{prl}$ are the coefficients with respect to formulae (11a) and (11b), $\phi$ is the bin shift angle, and N is the number of bins. In various embodiments, the number of bins N equals 32. However, the number of bins is not limited to 32.

After depth shifting, the measurements of tool 205-1 of FIG. 2A (or tool 205-2 of FIG. 2B) can be transferred to the measurements equivalent to a tool having the structure in FIG. 14. From the measurements taken to correspond to the structure in FIG. 14, two compensated measurements can be obtained directly. One compensated measurement is provided by effective perpendicular structure $T_{UP}$-$R_{12}$-$R_{22}$ and $R_{11}$-$R_{21}$-$T_{DN}$, in which the measurements are the same in a homogeneous anisotropic formation since ZX and XZ components cancel each other. For a bin structure of 32 bins, bins 1 and 17 are separated from each other by 180°. The bin structure can have a number of bins different from 32. The other compensated measurement is provided by effective parallel structure $T_{UP}$-$R_{11}$-$R_{21}$ and $T_{DN}$-$R_{12}$-$R_{22}$, where the difference between the measurements of the bins separated by 180° in this structure is double compared with a conventional ADR tool. From the measurement of the two effective structures, the location of anisotropic formations can be identified.

From computations of measurements of a tool shifted to operatively function as the tool in FIG. 14, measurements equivalent to a conventional physical ADR tool as shown in FIG. 15B, a traditional LWD tool as shown in FIG. 15C, ZX component as shown in FIG. 15D, and horizontal transmitter and receiver structure as shown in FIG. 16B can be obtained. As a result, the measurements of tool 205-1 of FIG. 2A (or tool 205-2 of FIG. 2B), configured to function as the structure in FIG. 14, can provide all the data that can be provided by a physical ADR tool and a traditional physical LWD tool. Tool 205-1 of FIG. 2A (or tool 205-2 of FIG. 2B) can be used in LWD applications to provide horizontal transmitter and receivers LWD measurements.

Using the measurements obtained to conform to the measurements equivalent to the physical structure shown in FIG. 14, a full voltage matrix can also be solved. The voltage matrix can be used to process a triaxial LWD measurement and to perform one dimensional inversion to obtain Rh, Rv, and dip angle of a formation. The relative azimuthal angle relative to a borehole can also be computed by bin shifting from the set of measurements taken corresponding to mimicking the configuration shown in FIG. 14. Operating a tool, such as tool 205-1 or 205-2 of FIGS. 2A and 2B, respectively, to effectively realize the tool of FIG. 14 can provide measurement solutions in deep water exploration to obtain structure dip, azimuth, Rh, and Rv.

Figure 17:
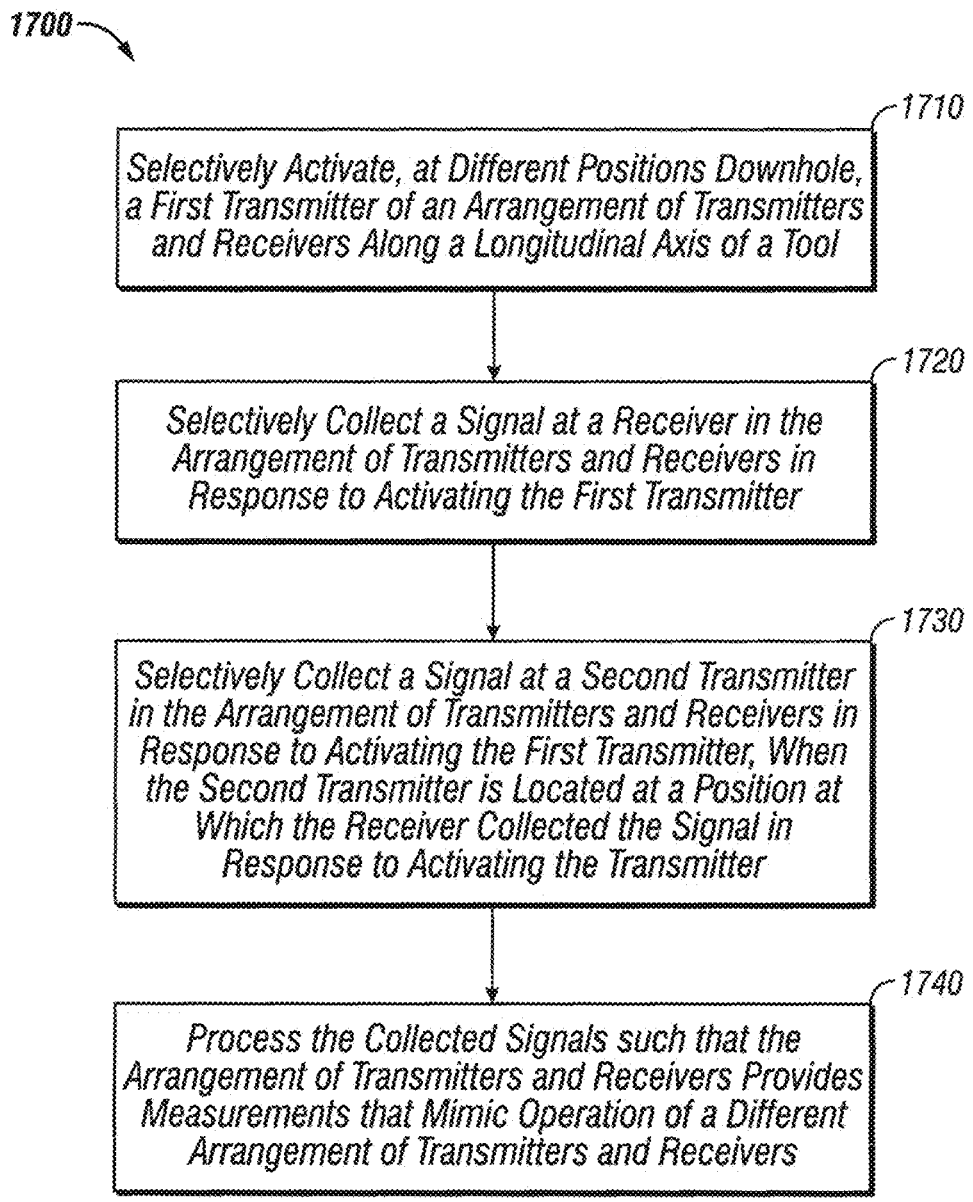
FIG. 17 shows features of an example method of operating a tool downhole in a well, according to various embodiments.

FIG. 17 shows features of an example embodiment of a method 1700 of operating a tool downhole in a well. At 1710, a first transmitter in an arrangement of transmitters and receivers along a longitudinal axis of a tool is selectively activated at different positions downhole. At 1720, a signal at a receiver in the arrangement of transmitters and receivers is selectively collected in response to activating the first transmitter. At 1730, a signal at a second transmitter in the arrangement of transmitters and receivers is selectively collected in response to activating the first transmitter, when the second transmitter is located at a position at which the receiver collected the signal in response to activating the transmitter. At 1740, the collected signals are processed such that the arrangement of transmitters and receivers provides measurements that mimic operation of a different arrangement of transmitters and receivers.

Method 1700 can be used with tools and processing units similar or identical to tools and processing units described herein. For example, the arrangement of transmitters and receivers along a longitudinal axis of a tool can be implemented using tool 205-1 of FIG. 2A or tool 205-2 of FIG. 2B. Depth shifting such tools to activate the transmitters at different positions downhole and collect signals at receivers and transmitters can be conducted such that a physical structure of an arrangement of transmitter antennas and receiver antennas different from the physical arrangement shown in FIGS. 2A and 2B can be mimicked by the physical arrangement shown in FIGS. 2A and 2B.

In various embodiments, a method can include, in addition to the processes discussed above with respect to method 1700, selectively activating, at different positions downhole, the second transmitter in the arrangement of transmitters and receivers; selectively collecting a signal at a receiver in the arrangement of transmitters and receivers in response to activating the second transmitter; selectively collecting a signal at the first transmitter in response to activating the second transmitter, when the first transmitter is located at a position at which the receiver collected a signal in response to activating the second transmitter; and processing the collected signals from activating the second transmitter with the collected signals from activating the first transmitter.

In various embodiments, a method can include, in addition to the processes discussed above with respect to method 1700, selectively activating, at different positions downhole, the second transmitter in the arrangement of transmitters and receivers; selectively collecting a signal at a receiver in the arrangement of transmitters and receivers in response to activating the second transmitter; selectively collecting a signal at the first transmitter in response to activating the second transmitter, when the first transmitter is located at a position at which the receiver collected a signal in response to activating the second transmitter; and processing the collected signals from activating the second transmitter with the collected signals from activating the first transmitter such that the arrangement of transmitters and receivers provides measurements that mimic measurements from a desired triaxial tool.

Various methods associated with method 1700 can include operation of a tool similar to or identical to tool 205-1 of FIG. 2A or tool 205-2 of FIG. 2B in accordance with the various operations discussed herein with respect to tool 205-1. Such operations can include various activations of transmitters and collections of signals at receivers and transmitters at different positions of the tool downhole. Positioning at such positions can be realized by depth shifting the tool. The various methods may be performed in which the arrangement of transmitters and receivers is structured as an arrangement of transmitter antennas and receiver antennas including the first transmitter antenna and the second transmitter antenna separated by two receiver antennas and arranged along the longitudinal axis of a tool with the first transmitter antenna, the second transmitter antenna, and the two receiver antennas tilted with respect to the longitudinal axis of the tool, the first transmitter antenna and the second transmitter antenna being oriented such that they lie in directions perpendicular to each other. The first and second transmitter antennas can be arranged as an up transmitter antenna and a down transmitter antenna, where up and down are relative to the longitudinal axis of the tool, with the tool being downhole. The first transmitter antenna, the second transmitter antenna, and the two receiver antennas can be arranged symmetrically relative to a reference location between the two receiver antennas.

In various embodiments, a method can include shifting the tool relative to a reference location between the two receiver antennas such that the first transmitter antenna or the second transmitter antenna is shifted to a position of one of the two receiver antennas relative to the reference location before the shift. Various methods can include selectively activating the transmitter antennas and selectively collecting signals at the receiver antennas and transmitter antennas at different angles of rotation of the tool, the different angles corresponding to partitioning a rotation of the tool into a number of different bins. From processing the collected signals, anisotropic formations can be identified. From the collected signals, computation of a voltage matrix can be conducted such that the tool operates as a triaxial tool. Using the computed voltage matrix, one or more of horizontal resistivity, vertical resistivity, or dip angle can be determined. In various methods similar to or identical to operations of tools and/or processing units described herein, the tool can be operated as a logging-while-drilling tool.

Various components of a tool, having an arrangement of transmitters and receivers, and a processing unit that selectively activates the transmitters and selectively collects signals received at the arrangement of transmitters and receivers at different locations downhole in a well such that the tool operates to mimic a tool structure having a different arrangement of transmitters and receivers, as described herein or in a similar manner, can be realized in hardware implementations, software implementations, and combinations of hardware and software implementations. These implementations may include a machine-readable storage medium having machine-executable instructions stored thereon, such as a computer-readable medium having computer-executable instructions, which instructions when executed by a processor, cause the machine to perform various operations. The operations can include selectively activating, at different positions downhole, a first transmitter in an arrangement of transmitters and receivers along a longitudinal axis of a tool; selectively collecting a signal at a receiver in the arrangement of transmitters and receivers in response to activating the first transmitter; selectively collecting a signal at a second transmitter in the arrangement of transmitters and receivers in response to activating the first transmitter, when the second transmitter is located at a position at which the receiver collected the signal in response to activating the transmitter; and processing the collected signals such that the arrangement of transmitters and receivers provides measurements that mimic operation of a different arrangement of transmitters and receivers. A machine-readable storage medium can be realized, where the machine-readable storage medium has instructions stored thereon, which when performed by a machine, cause the machine to perform operations, the operations comprising one or more processes, similar or identical to one or more processes described herein. In various embodiments, machine-readable storage medium is used with a processor to manage a tool and collect signals from the tool such that the tool mimics an arrangement of transmitters and receivers for a desired triaxial tool, which may not be physically implementable. The form of the machine-readable medium is not limited to any one type of machine-readable medium, but can be any machine-readable medium. For example, a machine-readable medium can include a data storage medium that can be implemented in a housing disposed in a collar of a drill string or in a wireline configuration and/or in a system control center.

Figure 18:
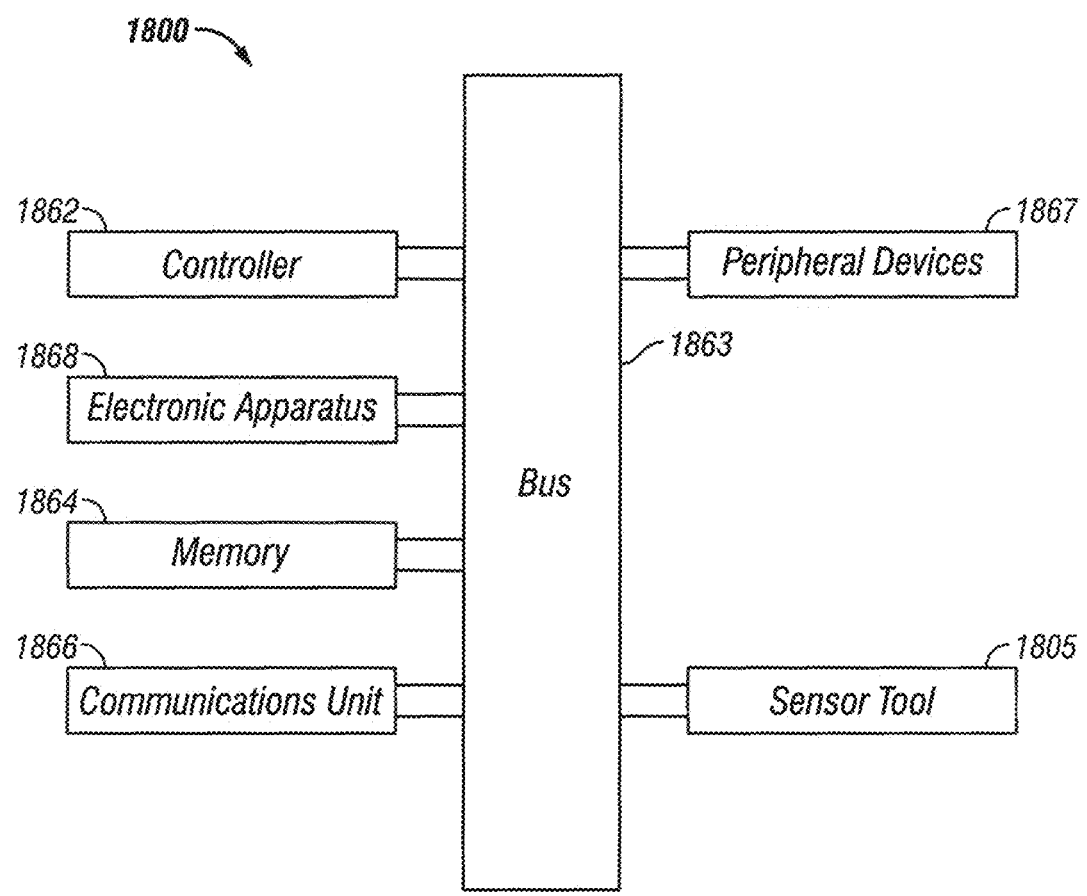
FIG. 18 depicts a block diagram of features of an example system having a processing unit and a tool to operatively provide measurements to mimic different arrangements of transmitters and receivers, according to various embodiments.

FIG. 18 depicts a block diagram of features of an example system 1800 having a processing unit and a tool to operatively provide measurements to mimic different arrangements of transmitters and receivers. System 1800 includes a sensor tool 1805 having an arrangement of transmitters and receivers in which measurement signals can be acquired in the arrangement of transmitters and receivers in response to selectively activating one or more transmitters in the arrangement, where processing the collected signals from the receivers and transmitter provides measurements such that the tool mimics a different arrangement of transmitters and receivers. Operating sensor tool 1805, in accordance with procedures similar or identical to procedures discussed herein, can provide measurements corresponding to sensor tool 1805 mimicking a desired triaxial tool, which may not be implementable in a physical arrangement of transmitters and receivers. An implementation of sensor tool 1805 can provide a triaxial LWD tool, which may not be physically implementable directly as a triaxial LWD tool. The arrangements of transmitters and receivers of sensor tool 1805 can be realized in similar or identical manner to arrangements discussed herein.

System 1800 can also include a controller 1862, a memory 1864, an electronic apparatus 1868, and a communications unit 1866. Controller 1862, memory 1864, and communications unit 1866 can be arranged to control operation of sensor tool 1805 in a manner similar or identical to a processing unit discussed herein. Various components of system 1800 can operate together as a processing unit to provide control and processing for sensor tool 1805 to mimic different arrangements of transmitter and receivers, such as a triaxial tool. Controller 1862, memory 1864, and electronic apparatus 1868 can be realized to control activation of transmitter antennas and selection of receiver antennas and transmitter antennas in sensor tool 1805 and to manage processing schemes in accordance with measurement procedures and signal processing as described herein. Communications unit 1866 can include downhole communications in a drilling operation. Such downhole communications can include a telemetry system.

System 1800 can also include a bus 1863, where bus 1863 provides electrical conductivity among the components of system 1800. Bus 1863 can include an address bus, a data bus, and a control bus, each independently configured. Bus 1863 can also use common conductive lines for providing one or more of address, data, or control, the use of which can be regulated by controller 1862. Bus 1863 can be configured such that the components of system 1800 are distributed. Such distribution can be arranged between downhole components such as transmitters and receivers of sensor tool 1805 and components that can be disposed on the surface. Alternatively, the components can be co-located such as on one or more collars of a drill string or on a wireline structure.

In various embodiments, peripheral devices 1867 can include displays, additional storage memory, and/or other control devices that may operate in conjunction with controller 1862 and/or memory 1864. In an embodiment, controller 1862 is a processor. Peripheral devices 1867 can be arranged with a display can be used with instructions stored in memory 1864 to implement a user interface to manage the operation of sensor tool 1805 and/or components distributed within system 1800. Such a user interface can be operated in conjunction with communications unit 1866 and bus 1863. Various components of system 1800 can be integrated with sensor tool 1805 such that processing identical to or similar to the processing schemes discussed with respect to various embodiments herein can be performed downhole in the vicinity of the measurement.

Figure 19:
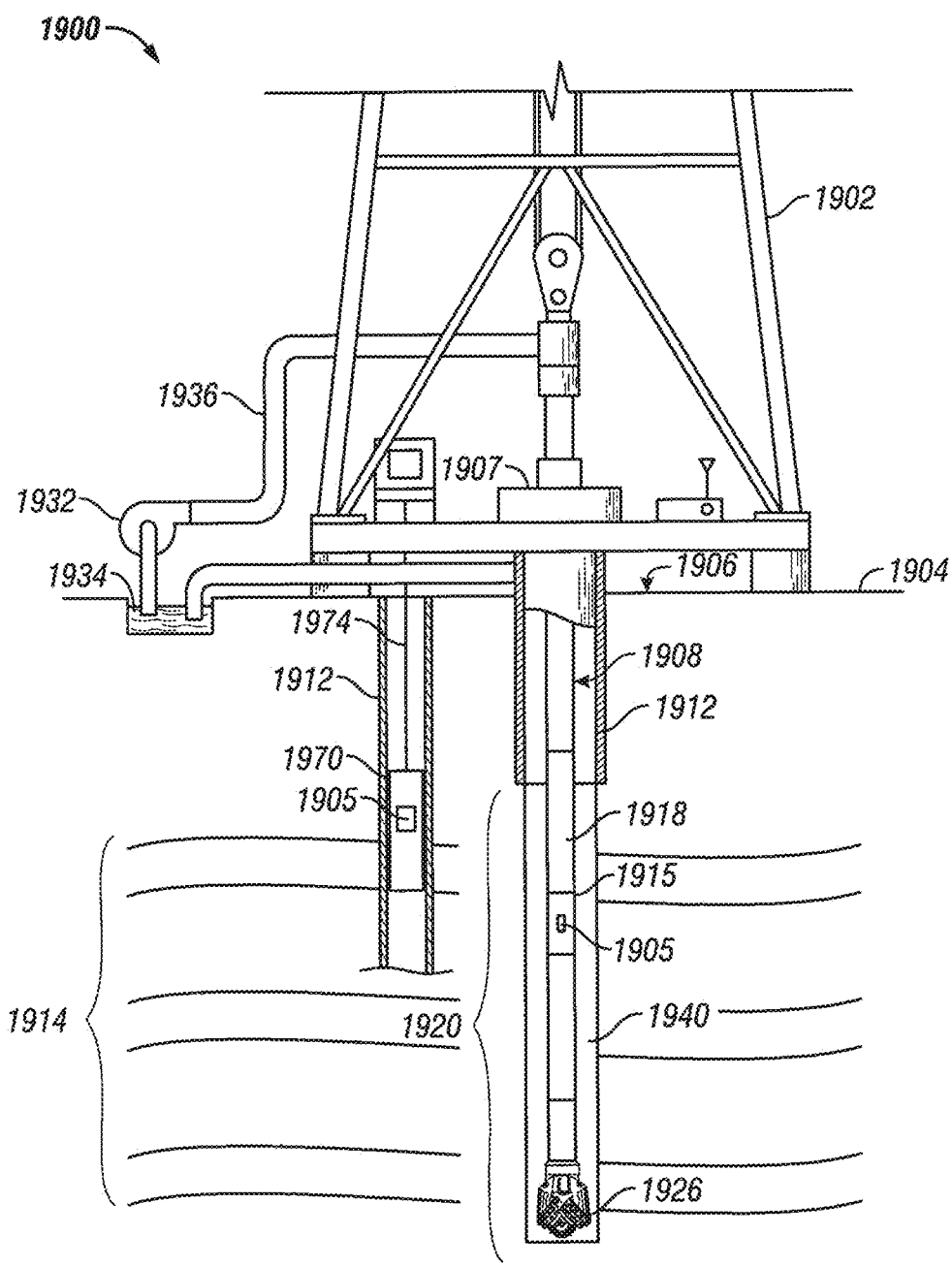
FIG. 19 depicts an embodiment of a system at a drilling site, according to various embodiments.

FIG. 19 depicts an embodiment of a system 1900 at a drilling site, where system 1900 includes a measurement tool 1905 having a processing unit and a sensor unit, where sensor unit includes an arrangement of transmitters and receivers in which measurement signals can be acquired in the arrangement of transmitters and receivers in response to selectively activating one or more transmitters in the arrangement, where processing the collected signals from the receivers and transmitter provides measurements such that the tool mimics a different arrangement of transmitters and receivers. Though shown as a single unit in FIG. 19 the processing unit of measurement can be distributed among downhole apparatus and surface apparatus. Measurement tool 1905 can be structured and fabricated in accordance with various embodiments as taught herein with respect to a processing unit and a sensor tool having an arrangement of transmitters and receivers.

System 1900 can include a drilling rig 1902 located at a surface 1904 of a well 1906 and a string of drill pipes, that is, drill string 1908, connected together so as to form a drilling string that is lowered through a rotary table 1907 into a wellbore or borehole 1912. The drilling rig 1902 can provide support for drill string 1908. The drill string 1908 can operate to penetrate rotary table 1907 for drilling a borehole 1912 through subsurface formations 1914. The drill string 1908 can include drill pipe 1918 and a bottom hole assembly 1920 located at the lower portion of the drill pipe 1918.

The bottom hole assembly 1920 can include drill collar 1915, measurement tool 1905 attached to drill collar 1915, and a drill bit 1926. The drill bit 1926 can operate to create a borehole 1912 by penetrating the surface 1904 and subsurface formations 1914. Measurement tool 1905 can be structured for an implementation in the borehole of a well as a measurements-while-drilling (MWD) system such as a logging-while-drilling (LWD) system. The housing containing measurement tool 1905 can include electronics to activate transmitters of measurement tool 1905 and collect responses from receivers and transmitters of measurement tool 1905. Such electronics can include a processing unit to analyze signals sensed by measurement tool 1905 and provide measurement results to the surface over a standard communication mechanism for operating a well. Alternatively, electronics can include a communications interface to provide signals sensed by measurement tool 1905 to the surface over a standard communication mechanism for operating a well, where these sensed signals can be analyzed at a processing unit at the surface.

In various embodiments, measurement tool 1905 may be included in a tool body 1970 coupled to a logging cable 1974 such as, for example, for wireline applications. Tool body 1970 containing measurement tool 1905 can include electronics to activate transmitters of measurement tool 1905 and collect responses from receivers and transmitters of measurement tool 1905. Such electronics can include a processing unit to analysis signals sensed by measurement tool 1905 and provide measurement results, such as formation properties, to the surface over a standard communication mechanism for operating a well. Alternatively, electronics can include a communications interface to provide signals sensed by measurement tool 1905 to the surface over a standard communication mechanism for operating a well, where these collected sensed signals are analyzed at a processing unit at the surface. Logging cable 1974 may be realized as a wireline (multiple power and communication lines), a mono-cable (a single conductor), and/or a slick-line (no conductors for power or communications), or other appropriate structure for use in bore hole 1912.

During drilling operations, the drill string 1908 can be rotated by the rotary table 1907. In addition to, or alternatively, the bottom hole assembly 1920 can also be rotated by a motor (e.g., a mud motor) that is located downhole. The drill collars 1915 can be used to add weight to the drill bit 1926. The drill collars 1915 also can stiffen the bottom hole assembly 1920 to allow the bottom hole assembly 1920 to transfer the added weight to the drill bit 1926, and in turn, assist the drill bit 1926 in penetrating the surface 1904 and subsurface formations 1914.

During drilling operations, a mud pump 1932 can pump drilling fluid (sometimes known by those of skill in the art as "drilling mud") from a mud pit 1934 through a hose 1936 into the drill pipe 1918 and down to the drill bit 1926. The drilling fluid can flow out from the drill bit 1926 and be returned to the surface 1904 through an annular area 1940 between the drill pipe 1918 and the sides of the borehole 1912. The drilling fluid may then be returned to the mud pit 1934, where such fluid is filtered. In some embodiments, the drilling fluid can be used to cool the drill bit 1926, as well as to provide lubrication for the drill bit 1926 during drilling operations. Additionally, the drilling fluid may be used to remove subsurface formation 1914 cuttings created by operating the drill bit 1926.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method of measuring properties downhole utilizing operation of a processor, the method comprising:
    activating, at different positions downhole, a first transmitter in an arrangement of transmitters and receivers along a longitudinal axis;
    collecting a signal at a receiver in the arrangement of transmitters and receivers in response to activating the first transmitter;
    collecting a signal at a second transmitter in the arrangement of transmitters and receivers in response to activating the first transmitter, when the second transmitter is located at the same position at which the receiver collects the signal in response to activating the first transmitter; and
    processing the collected signals to provide measurements that mimic operation of a different arrangement of transmitters and receivers.

2. The method of claim 1, wherein the method comprising:
    activating, at different positions downhole, the second transmitter in the arrangement of transmitters and receivers;
    collecting a signal at the receiver or another receiver in the arrangement of transmitters and receivers in response to activating the second transmitter;
    collecting a signal at the first transmitter in response to activating the second transmitter, when the first transmitter is located at the same position at which the or the other receiver collects the signal in response to activating the second transmitter; and
    processing the collected signals from activating the second transmitter with the collected signals from activating the first transmitter to provide the measurements that mimic operation of the different arrangement of transmitters and receivers.

3. The method of claim 1, wherein processing the collected signals includes processing together the signals collected at the same position both by one of the transmitters and by the respective receiver, each in response to activating the other transmitter at corresponding different downhole positions of the arrangement of transmitters and receivers, to provide measurements that mimic measurements obtainable at a single downhole position by operation of the different arrangement of transmitters and receivers.

4. The method of claim 1, wherein the collected signals are processed to mimic measurements from a triaxial tool having the different arrangement of transmitters and receivers.

5. The method of claim 1, wherein the arrangement of transmitters and receivers includes the first transmitter and the second transmitter separated by two receivers and arranged along the longitudinal axis of a tool with the first transmitter, the second transmitter, and the two receivers tilted with respect to the longitudinal axis of the tool, the first transmitter and the second transmitter being oriented such that they lie in directions perpendicular to each other.

6. The method of claim 5, wherein the first transmitter and the second transmitter are arranged equidistant on either side of a reference location which is at the midpoint between the two receivers.

7. The method of claim 6, wherein the method includes shifting the tool relative to the reference location between the two receivers such that the first transmitter or the second transmitter is shifted to a position of one of the two receivers relative to the reference location before the shift.

8. The method of claim 1, wherein the method includes selectively activating the transmitters and selectively collecting signals at the receivers and at one or more of the transmitters at different angles of rotation of the arrangement of transmitters and receivers about the longitudinal axis, the signals at different angles being collected in a number of different bins corresponding to partitions of a complete rotation about the axis.

9. The method of claim 1, wherein the method further includes identifying anisotropic downhole formations from the processed collected signals.

10. The method of claim 1, wherein the method includes computing a voltage matrix from the collected signals such that the arrangement of transmitters and receivers operates as a triaxial tool.

11. The method of claim 10, wherein the method includes determining one or more of horizontal resistivity, vertical resistivity, or dip angle using the voltage matrix.

12. The method of claim 1, wherein the method includes operating the arrangement of transmitters and receivers as part of a logging-while-drilling tool.

13. A non-transitory machine-readable storage medium having instructions stored thereon, which, when performed by a processor, cause the processor to perform operations, the operations comprising operations to:
    activate, at different positions downhole, a first transmitter in an arrangement of transmitters and receivers along a longitudinal axis;
    collect a signal at a receiver in the arrangement of transmitters and receivers in response to activating the first transmitter;
    collect a signal at a second transmitter in the arrangement of transmitters and receivers in response to activating the first transmitter, when the second transmitter is located at the same position at which the receiver collects the signal in response to activating the first transmitter; and
    process the collected signals to provide measurements that mimic operation of a different arrangement of transmitters and receivers.

14. The non-transitory machine-readable storage medium of claim 13, wherein the operations comprise operations to:
    activate, at different positions downhole, the second transmitter in the arrangement of transmitters and receivers;

collect a signal at the receiver or another receiver in the arrangement of transmitters and receivers in response to activating the second transmitter;

collect a signal at the first transmitter in response to activating the second transmitter, when the first transmitter is located at the same position at which the or the other receiver collects the signal in response to activating the second transmitter; and process the collected signals from activating the second transmitter with the collected signals from activating the first transmitter to provide the measurements that mimic operation of the different arrangement of transmitters and receivers.

15. The non-transitory machine-readable storage medium of claim 13, wherein the operations to process the collected signals include processing together the signals collected at the same position both by one of the transmitters and by the respective receiver, each in response to activating the other transmitter at corresponding different downhole positions of the arrangement of transmitters and receivers, to provide measurements that mimic measurements obtainable at a single downhole position by operation of the different arrangement of transmitters and receivers.

16. The non-transitory machine-readable storage medium of claim 13, wherein the collected signals are processed to mimic measurements from a triaxial tool having the different arrangement of transmitters and receivers.

17. The non-transitory machine-readable storage medium of claim 13, wherein the arrangement of transmitters and receivers includes the first transmitter and the second transmitter separated by two receivers and arranged along the longitudinal axis of a tool with the first transmitter, the second transmitter, and the two receivers tilted with respect to the longitudinal axis of the tool, the first transmitter and the second transmitter being oriented such that they lie in directions perpendicular to each other.

18. The non-transitory machine-readable storage medium of claim 17, wherein the first transmitter and the second transmitter are arranged equidistant on either side of a reference location which is at the midpoint between the two receivers.

19. The non-transitory machine-readable storage medium of claim 18, wherein the operations include shifting the tool relative to the reference location between the two receivers such that the first transmitter or the second transmitter is shifted to a position of one of the two receivers relative to the reference location before the shift.

20. The non-transitory machine-readable storage medium of claim 13, wherein the operations include selectively activating the transmitters and selectively collecting signals at the receivers and at one or more of the transmitters at different angles of rotation of the arrangement of transmitters and receivers about the longitudinal axis, the signals at different angles being collected in a number of different bins corresponding to partitions of a complete rotation about the axis.

21. The non-transitory machine-readable storage medium of claim 13, wherein the operations include identifying anisotropic downhole formations from the processed collected signals.

22. The non-transitory machine-readable storage medium of claim 13, wherein the operations include computing a voltage matrix from the collected signals such that the arrangement of transmitters and receivers operates as a triaxial tool.

23. The non-transitory machine-readable storage medium of claim 13, wherein the operations include determining one or more of horizontal resistivity, vertical resistivity, or dip angle using the voltage matrix.

24. The non-transitory machine-readable storage medium of claim 13, wherein the operations include operating in a logging-while-drilling operation.

25. An apparatus to measure properties downhole, the apparatus comprising:
a tool having an arrangement of transmitters and receivers along a longitudinal axis of the tool; and
a processing unit to control activation of the transmitters of the tool and to process signals received from receivers and transmitters in the tool, the processing unit including a processor, the processing unit operable with the tool to:
activate, at different positions downhole, a first transmitter in an arrangement of transmitters and receivers along a longitudinal axis;
collect a signal at a receiver in the arrangement of transmitters and receivers in response to activating the first transmitter;
collect a signal at a second transmitter in the arrangement of transmitters and receivers in response to activating the first transmitter, when the second transmitter is located at the same position at which the receiver collects the signal in response to activating the first transmitter; and
process the collected signals to provide measurements that mimic operation of a different arrangement of transmitters and receivers.

26. The apparatus of claim 25, wherein the processing unit is operable with the tool to:
activate, at different positions downhole, the second transmitter in the arrangement of transmitters and receivers;
collect a signal at the receiver or another receiver in the arrangement of transmitters and receivers in response to activating the second transmitter;
collect a signal at the first transmitter in response to activating the second transmitter, when the first transmitter is located at the same position at which the or the other receiver collects the signal in response to activating the second transmitter; and
process the collected signals from activating the second transmitter with the collected signals from activating the first transmitter to provide the measurements that mimic operation of the different arrangement of transmitters and receivers.

27. The apparatus of claim 25, wherein the processing unit operable with the tool to process the collected signals includes the processing unit operable with the tool to process together the signals collected at the same position both by one of the transmitters and by the respective receiver, each in response to activating the other transmitter at corresponding different downhole positions of the arrangement of transmitters and receivers, to provide measurements that mimic measurements obtainable at a single downhole position by operation of the different arrangement of transmitters and receivers.

28. The apparatus of claim 25, wherein the processing unit is operable with the tool to process the collected signals to mimic measurements from a triaxial tool having the different arrangement of transmitters and receivers.

29. The apparatus of claim 25, wherein the arrangement of transmitters and receivers includes the first transmitter and the second transmitter separated by two receivers and arranged along the longitudinal axis of a tool with the first transmitter, the second transmitter, and the two receivers tilted with respect to the longitudinal axis of the tool, the first transmitter and the second transmitter being oriented such that they lie in directions perpendicular to each other.

30. The apparatus of claim 29, wherein the first transmitter and the second transmitter are arranged equidistant on either side of a reference location which is at the midpoint between the two receivers.

31. The apparatus of claim 30, wherein the processing unit is operable with the tool to shift the tool relative to the reference location between the two receivers such that the first transmitter or the second transmitter is shifted to a position of one of the two receivers relative to the reference location before the shift.

32. The apparatus of claim 25, wherein the processing unit is operable with the tool to selectively activate the transmitters and selectively collect signals at the receivers and at one or more of the transmitters at different angles of rotation of the arrangement of transmitters and receivers about the longitudinal axis, the signals at different angles being collected in a number of different bins corresponding to partitions of a complete rotation about the axis.

33. The apparatus of claim 25, wherein the processing unit is operable to identify anisotropic downhole formations from the processed collected signals.

34. The apparatus of claim 25, wherein the processing unit is operable to compute a voltage matrix from the collected signals such that the arrangement of transmitters and receivers operates as a triaxial tool.

35. The apparatus of claim 34, wherein the processing unit is operable to determine one or more of horizontal resistivity, vertical resistivity, or dip angle using the voltage matrix.

36. The apparatus of claim 25, wherein the processing unit is operable with the tool in a logging-while-drilling arrangement.

37. A method of measuring properties downhole utilizing operation of a processor, the method comprising:
    activating, at different positions downhole, a first transmitter in an arrangement of transmitters and receivers along a longitudinal axis;
    collecting a signal at a receiver in the arrangement of transmitters and receivers in response to activating the first transmitter at a first downhole position;
    collecting a signal at a second transmitter in the arrangement of transmitters and receivers in response to activating the first transmitter at a second downhole position; and
    processing together the signals collected at the first and second positions, respectively by the receiver and the second transmitter, in response to activating the first transmitter at each position, to provide measurements that mimic measurements obtainable at a single downhole position with a different arrangement of transmitters and receivers.

38. The method of claim 37, wherein the collected signals are processed to mimic measurements from a triaxial tool having the different arrangement of transmitters and receivers.

39. A method of measuring properties downhole utilizing operation of a processor, the method comprising:
    activating, at different positions downhole, a transmitter in an arrangement of transmitters and receivers along a longitudinal axis;
    collecting a signal at a first receiver in the arrangement of transmitters and receivers in response to activating the first transmitter at a first downhole position;
    collecting a signal at a second receiver in the arrangement of transmitters and receivers in response to activating the first transmitter at a second downhole position, at which second downhole position the second receiver is at the same location at which the first receiver collects the signal in response to activating the first transmitter at the first downhole position; and
    processing together the signals collected by both of the first and second receivers at the same location, in response to activating the first transmitter at each downhole position, to provide measurements that mimic measurements obtainable at a single downhole position with a different arrangement of transmitters and receivers.

40. The method of claim 39, wherein one or both of the first and second receivers is a transceiver or a transmitter operated as a receiver.

* * * * *